(12) United States Patent
Hasbun et al.

(10) Patent No.: US 11,003,388 B2
(45) Date of Patent: *May 11, 2021

(54) PREFETCH SIGNALING IN MEMORY SYSTEM OR SUB SYSTEM

(71) Applicant: Micron Technology, Inc., Boise, ID (US)

(72) Inventors: Robert Nasry Hasbun, San Jose, CA (US); Dean D. Gans, Nampa, ID (US); Sharookh Daruwalla, San Ramon, CA (US)

(73) Assignee: Microon Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,533

(22) Filed: Aug. 29, 2018

(65) Prior Publication Data

US 2019/0347043 A1    Nov. 14, 2019

Related U.S. Application Data

(63) Continuation of application No. 15/975,617, filed on May 9, 2018.

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
See application file for complete search history.

(56) References Cited

U.S. PATENT DOCUMENTS 6,115,760 A     9/2000   Lo et al.
6,249,461 B1 *  6/2001   Choi ................ G11C 16/26
                                                 365/185.33

(Continued)

FOREIGN PATENT DOCUMENTS

WO    2016097809 A1    6/2016
WO    2017131871 A1    8/2017

OTHER PUBLICATIONS

ISA/KR, International Search Report and Written Opinion of the International Searching Authority, Int'l. Appl. No. PCT/US2019/028683, dated Aug. 27, 2019, Korean Intellectual Property Office, Seo-gu, Daejeon, Republic of Korea, 12 pgs.

(Continued)

*Primary Examiner* — Larry T Mackall
(74) *Attorney, Agent, or Firm* — Holland & Hart LLP

(57) ABSTRACT

Methods, systems, and devices for prefetch signaling in a memory system or sub-system are described. A memory device (e.g., a local memory controller of memory device) of a main memory may transmit a prefetch indicator indicating a size of prefetch data associated with a first set of data requested by an interface controller. The size of the prefetch data may be equal to or different than the size of the first set of data. The main memory may, in some examples, store the size of prefetch data along with the first set of data. The memory device may transmit the prefetch indicator (e.g., an indicator signal) to the interface controller using a pin compatible with an industry standard or specification and/or a separate pin configured for transmitting command or control information. The memory device may transmit the prefetch indicator while the first set of data is being transmitted.

12 Claims, 10 Drawing Sheets

(56) References Cited

U.S. PATENT DOCUMENTS

| | | | |
|---|---|---|---|
| 6,353,874 B1 | 3/2002 | Morein | |
| 6,453,389 B1* | 9/2002 | Weinberger | G06F 12/0862 711/137 |
| 6,692,976 B1* | 2/2004 | Mirkarimi | H01L 21/0206 257/E21.009 |
| 6,963,954 B1* | 11/2005 | Trehus | G06F 12/0215 711/137 |
| 7,089,331 B1* | 8/2006 | Gollapudi | H04L 69/04 709/247 |
| 7,620,748 B1 | 11/2009 | Bruce et al. | |
| 8,549,210 B2 | 10/2013 | Hunter et al. | |
| 8,788,765 B2 | 7/2014 | Jeddeloh | |
| 8,959,307 B1 | 2/2015 | Bruce et al. | |
| 9,780,782 B2 | 10/2017 | Bains et al. | |
| 2003/0105926 A1* | 6/2003 | Rodriguez | G06F 12/04 711/129 |
| 2004/0128449 A1 | 7/2004 | Osborne et al. | |
| 2004/0141374 A1 | 7/2004 | Park et al. | |
| 2006/0053256 A1 | 3/2006 | Moyer et al. | |
| 2006/0125835 A1 | 6/2006 | Sha et al. | |
| 2006/0259735 A1 | 11/2006 | Anand et al. | |
| 2006/0265552 A1 | 11/2006 | Davis et al. | |
| 2007/0011421 A1 | 1/2007 | Keller et al. | |
| 2007/0038829 A1 | 2/2007 | Tousek | |
| 2007/0067382 A1* | 3/2007 | Sun | G06F 12/0862 709/203 |
| 2008/0183977 A1* | 7/2008 | Gower | G06F 12/0215 711/154 |
| 2009/0063734 A1 | 3/2009 | Kurata et al. | |
| 2009/0196102 A1 | 8/2009 | Kim | |
| 2010/0268886 A1 | 10/2010 | Frey et al. | |
| 2010/0293337 A1 | 11/2010 | Murphy et al. | |
| 2012/0185651 A1 | 7/2012 | Kimori | |
| 2012/0290768 A1 | 11/2012 | Rubowitz | |
| 2014/0040561 A1 | 2/2014 | Lih et al. | |
| 2014/0115294 A1 | 4/2014 | Fleischer et al. | |
| 2014/0237205 A1 | 8/2014 | Takefman et al. | |
| 2015/0347013 A1 | 12/2015 | Mathur et al. | |
| 2015/0371689 A1 | 12/2015 | Li et al. | |
| 2016/0117131 A1 | 4/2016 | Karamcheti | |
| 2016/0350236 A1 | 12/2016 | Tsirkin | |
| 2017/0068467 A1* | 3/2017 | Rothberg | G11C 16/3495 |
| 2017/0123988 A1* | 5/2017 | Chun | G06F 12/0862 |
| 2018/0121106 A1 | 5/2018 | Kim | |
| 2018/0165211 A1 | 6/2018 | Wang et al. | |
| 2018/0373313 A1 | 12/2018 | Hasbun | |
| 2018/0373641 A1 | 12/2018 | Partap Singh Rana et al. | |
| 2019/0004796 A1 | 1/2019 | Pelster et al. | |

OTHER PUBLICATIONS

ISA/KR, International Search Report and Written Opinion of the International Searching Authority, Int'l. Appl. No. PCT/US2019/028688, dated Aug. 29, 2019, Korean Intellectual Property Office, Seo-gu, Daejeon, Republic of Korea, 12 pgs.

ISA/KR, International Search Report and Written Opinion of the International Searching Authority, Int'l. Appl. No. PCT/US2019/028841, dated Sep. 24, 2019, Korean Intellectual Property Office, Seo-gu, Daejeon, Republic of Korea, 13 pgs.

ISA/KR, International Search Report and Written Opinion of the International Searching Authority, Int'l. Appl. No. PCT/US2019/028843, dated Sep. 26, 2019, Korean Intellectual Property Office, Seo-gu, Daejeon, Republic of Korea, 15 pgs.

* cited by examiner

PREFETCH SIGNALING IN MEMORY SYSTEM OR SUB SYSTEM

CROSS REFERENCE

The present Application for Patent is a continuation of U.S. patent application Ser. No. 15/975,617 by Hasbun et al., entitled "Prefetch Signaling In Memory System Or Sub-System," filed May 9, 2018, assigned to the assignee hereof, and is expressly incorporated by reference in its entirety herein.

BACKGROUND

The following relates generally to memory systems or sub-systems and more specifically to prefetch signaling in a memory system or sub-system.

A memory system may include various kinds of memory devices and controllers, which may be coupled via one or more buses to manage information in numerous electronic devices such as computers, wireless communication devices, internet of things devices, cameras, digital displays, and the like. Memory devices are widely used to store information in such electronic devices. Information may be stored in a memory device by programing different states of one or more memory cells within the memory device. For example, a binary memory cell may store one of two states, often denoted as a logic "1" or a logic "0." Some memory cells may be able to store more than two states.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells, e.g., DRAM cells, may lose their stored logic state over time unless they are periodically refreshed by an external power source.

Improving memory systems, generally, may include reducing system power consumption, increasing memory system capacity, improving read/write speeds, providing non-volatility by use of persistent main memory, or reducing manufacturing costs at a certain performance point, among other metrics.

DETAILED DESCRIPTION

Figure 1:
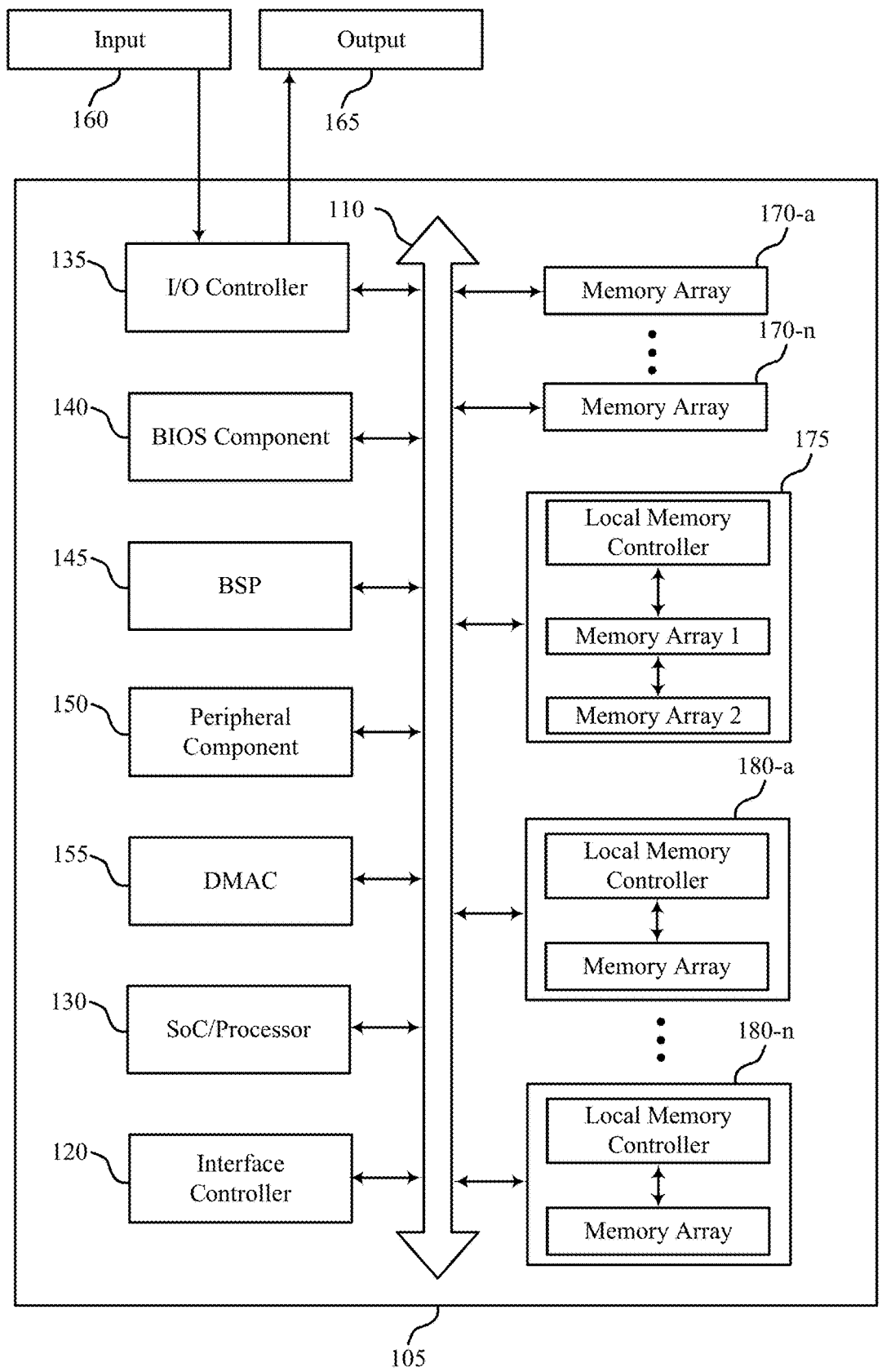
FIG. 1 shows a diagram of a system including a memory system or sub-system that supports prefetch signaling in a memory system or sub-system in accordance with examples of the present disclosure.

A memory system may include one or more memory devices as a main memory for a host (e.g., a system on chip (SoC) or processor). In some examples, a memory device may include an array of non-volatile memory cells (e.g., FeRAM cells). The non-volatile memory array, when included as a main memory in a memory system, may provide benefits (e.g., relative to a volatile memory array) such as non-volatility, higher capacity, less power consumption, or variable page size. In the context of a memory device, a page size may refer to a size of data handled at various interfaces. Different memory device types may have different page sizes, and the page size of an individual memory device may be variable or non-variable.

In some cases, one or more aspects of the non-volatile memory array may lack direct compatibility with corresponding aspects of the host—e.g., different latencies associated with access operations (e.g., read or write operations) or different page sizes. As such, the memory system may further include an interface controller to perform or manage various interactions between the host and the memory device. The memory system may also include additional memory elements (e.g., a buffer, a virtual memory bank) that further facilitate interactions between the host and the memory device. In some cases, the memory device may have a local memory controller (e.g., local to the memory device) that may, in conjunction with the interface controller, perform various operations associated with the array of non-volatile memory cells.

An interface controller of a memory system, while operating with an SoC/processor, may prefetch a set of data from a memory device (e.g., a main memory). In some cases, the interface controller may anticipate that the SoC/processor is likely to access a certain set of data. For example, the interface controller may determine to prefetch a set of data based on characteristics of a currently on-going operation (e.g., the SoC/processor accessing a stream of data for a graphics application). In other examples, the interface controller may determine to prefetch a set of data based on the speed of a bus (e.g., a high bus speed processing a large volume of data with a low latency), on which the SoC/processor operates. Prefetching data from the memory device (and storing the data in a buffer or a virtual memory bank) may facilitate interactions between the SoC/processor and the memory device despite one or more incompatible aspects of the SoC/processor and the memory device (e.g., different access speeds, different page sizes).

For example, by prefetching data from the memory device and making the prefetched data available in the buffer or the virtual memory bank of the memory system, the interface controller may provide the prefetched data to the SoC/processor while mitigating the impact of one or more incompatible aspects of the SoC/processor and the memory device.

In some cases, the interface controller may prefetch data from the memory device in order to satisfy overall performance requirements (e.g., power consumption, read latency)

of the memory system. For example, a size of data to be prefetched from the memory device by the interface controller may depend on an operation mode of the memory system. The size of data to be prefetched may be referred to as a prefetch size. For example, in a power conservation mode, the interface controller may prefetch a minimum size of data from the memory device.

Prefetching a minimum size of data may minimize power consumption for the memory system but may result in additional time delay (e.g., read latency) from the perspective of the SoC/processor. In a high performance mode, on the other hand, the interface controller may prefetch a maximum size of data from the memory device although only a portion of the prefetched data may be useful for the SoC/processor. Prefetching a maximum size of data may minimize time delay (e.g., read latency) from the perspective of the SoC/processor but may result in increased power consumption for the memory system.

The interface controller may determine and preconfigure the prefetch size associated with a set of data based at least in part on an access pattern for the set of data, which may be based on access operations by the SoC/processor while the set of data is in a buffer. For example, the SoC/processor may access a first set of data (e.g., 64 bytes) as a part of a second set of data (e.g., 256 bytes). In other examples, the SoC/processor may access a first set of data (e.g., 64 bytes) immediately after or before accessing a second set of data (e.g., 192 bytes).

In some cases, the interface controller may determine a prefetch size associated with a set of data based on various criteria including an access pattern by the SoC/processor in a most recent access operation, a history of access patterns by the SoC/processor in a number of past access operations, a specific prefetch size specified by the SoC/processor, an operation mode of the memory system, a bus configuration between the SoC/processor and the memory system, or any combination thereof. When the interface controller evicts the set of data from the buffer, the interface controller may determine the prefetch size for the set of data and store the determined prefetch size in association with the set of data in the memory device that stores the set of data. In some cases, the interface controller may store the prefetch size as an indicator associated with the set of data.

The memory device (e.g., a local memory controller of the memory device), upon receiving a read command from the interface controller requesting a set of data (e.g., when the interface controller prefetches the set of data), may identify a prefetch size based on the indicator that has been stored in the memory device in association with the set of data. The indicator may be referred to as a prefetch (PF) counter. The PF counter may comprise one or more memory bits preconfigured to indicate a size of data to be prefetched (e.g., a prefetch size). The memory device may identify the prefetch size for the set of data by reading the PF counter and may transmit to the interface controller an amount of data pursuant to the indicated prefetch size (e.g., the set of data subject to the read command received by the memory device from the interface controller plus any additional data necessary to satisfy the prefetch size). The memory device may also transmit a signal indicating the prefetch size (e.g., a signal indicative of the total amount of data being transmitted to the interface controller) to the interface controller, which may be referred to as a prefetch indicator signal.

When storing a value of a PF counter (e.g., a prefetch size of data) in the memory device (e.g., in the non-volatile memory array), the interface controller may also designate a group of memory cells in the memory device for storing the value of the PF counter. For example, the interface controller may designate a group of memory cells that exhibit a faster access speed than other memory cells of the memory device (e.g., other memory cells in the memory device that store the data associated with the PF counter), which may increase the speed with which the memory device may identify a prefetch size for an associated set of data. In turn, increasing the speed with which the memory device may identify a prefetch size may facilitate the memory device determining the prefetch size and transmitting a signal related to the prefetch size (e.g., prefetch indicator signal) to the interface controller while (e.g., concurrently with) transmitting the requested data to the interface controller.

The interface controller may dynamically update the value of the PF counter stored in the memory device when, for example, the interface controller determines that the SoC/process has established a different access pattern to the data. In some cases, where the interface controller determines that the data has not been modified by the SoC/processor while present in a buffer, the interface controller may update the value of the PF counter without writing the data back to the memory device—e.g., when evicting data from the buffer, the interface controller may write the memory device an updated value of the PF counter along with modified aspects of the associated set of data, if any.

When the interface controller prefetches data from the memory device (e.g., main memory), the interface controller may transmit a read command for a first size of data (e.g., 64 bytes). The memory device, upon receiving the read command, may identify a prefetch size for the requested data by accessing the PF counter associated with the requested data. In some cases, the prefetch size indicated by the PF counter (e.g., 64 bytes) may be identical to the first size of data. In other cases, the prefetch size indicated by the PF counter (e.g., 192 bytes) may be different from the first size of data.

The memory device (e.g., a local memory controller of the memory device) may transmit an amount of data pursuant to the prefetch size (e.g., 64 bytes or 192 bytes as identified from the PF counter) to the interface controller. The memory device may also transmit to the interface controller a signal indicating the prefetch size (e.g., a prefetch indicator signal). In some cases, the memory device may transmit the requested data to the interface controller via one or more data pins and transmit the prefetch indicator signal via one or more other pins. For example, the memory device may transmit the requested data to the interface controller via one or more data pins while concurrently transmitting the prefetch indicator signal via the one or more other pins.

A prefetch indicator signal may inform the interface controller whether the size of data being transmitted to the interface controller by the memory device (e.g., a local memory controller of the memory device) in response to a read command (e.g., via data pins) is equal to or greater than the size of data requested by the read command. The interface controller, based on receiving the prefetch indicator signal, may determine a next operation (e.g., continuing to monitor the data pins to receive more data than requested) based on the prefetch size information included in the prefetch indicator signal. In this manner, the management of prefetch operations may be simplified from the interface controller's perspective as the memory device may identify a prefetch size associated with the requested data based on the PF counter (e.g., the prefetch size previously determined by the interface controller) and inform the interface controller while sending the requested data.

For example, by determining the prefetch size upon evicting a set of data from a buffer and causing the memory device to store the prefetch size in association with the set of data, the interface controller may not have to determine the prefetch size when subsequently initiating a prefetch operation for the set of data—the interface controller may instead be informed by the memory device of the prefetch size previously determined by the interface controller. This may provide benefits, such as latency or efficiency benefits, at the time of a prefetch operation by the interface controller, which may in some cases be a latency-sensitive time relative to other times (e.g., when eviction from the buffer may occur).

The memory device (e.g., a local memory controller of the memory device) may transmit the prefetch indicator signal to the interface controller using a pin that is compatible with a low power double data rate (LPDDR) specification in some cases. For example, the memory device may use a data mask/inversion (DMI) pin or a link error correction code (ECC) parity pin to transmit the prefetch indicator signal to the interface controller. A separate pin of the memory device (e.g., a pin different than data pins or LPDDR-specified pins) may be configured for transmitting command or control information to the interface controller in order to transmit the prefetch indicator signal to the interface controller. In some cases, the separate pin may be referred to as a response (RSP) pin.

The memory device (e.g., a local memory controller of the memory device) may determine that retrieving the data in accordance with the prefetch size indicated by the PF counter requires activating an additional set of memory cells beyond those necessary to retrieve only the data requested by the interface controller. For example, the memory device may determine that retrieving the data in accordance with the prefetch size indicated by the PF counter requires activating one or more subpages of the non-volatile memory array beyond the subpage(s) that include the requested data.

As such, the memory device (e.g., a local memory controller of the memory device) may determine that an additional amount of time will be required for the memory device to transmit the prefetched data in its entirety to the interface controller. The memory device may transmit to the interface controller a wait signal indicating a time delay such that the interface controller may be informed of the additional time associated with transmitting the prefetched data in its entirety (e.g., with activating the one or more subpages). In some cases, the interface controller may transmit a second read command after the indicated time delay based at least in part on receiving the wait signal, the second read command for any unreceived prefetch data associated with the set of data subject to the initial read command by the interface controller.

Features of the disclosure introduced above are further described below at an exemplary system level in the context of FIG. 1. Specific examples of memory systems and operations are then described in the context of FIGS. 2 through 4. These and other features of the disclosure are further illustrated by and described with reference to the apparatus diagrams of FIGS. 5 and 6, which describe various components related to controllers, as well as the flowcharts of FIGS. 7 through 9, which relate to operations of prefetch signaling in a memory system or sub-system.

FIG. 1 shows a diagram of a system 100 including a memory system or sub-system that supports prefetch signaling in a memory system or sub-system in accordance with examples of the present disclosure. System 100 may include a device 105. The device 105 may include an interface controller 120, an SoC or processor 130, and various memory devices 170, 175, and 180. Device 105 may also include an input/output controller 135, a basic input/output system (BIOS) component 140, a board support package (BSP) 145, peripheral component(s) 150, and a direct memory access controller (DMAC) 155. The components of device 105 may be in electronic communication with one another through a bus 110.

Device 105 may be a computing device, electronic device, mobile computing device, or wireless device. Device 105 may be a portable electronic device. For example, device 105 may be a computer, a laptop computer, a tablet computer, a smartphone, a cellular phone, a wearable device, an internet-connected device, or the like. In some examples, device 105 may be configured for bi-directional wireless communication via a base station or access point. Device 105 may be capable of machine-type communication (MTC), machine-to-machine (M2M) communication, or device-to-device (D2D) communication. Device 105 may be referred to as a user equipment (UE), station (STA), mobile terminal, or the like.

Interface controller 120 may be configured to interface with SoC/processor 130. Interface controller 120 may also be configured to interface with various memory devices 170, 175, 180, or any combination thereof. In some cases, interface controller 120 may be configured to perform or to cause memory devices 170, 175, 180 to perform one or more functions ascribed herein to memory devices 170, 175, 180 (e.g., ascribed to a local memory controller of memory device 175 or 180).

SoC/processor 130 may be configured to operate with various memory devices 170, 175, 180, or any combination thereof—either directly or via interface controller 120. SoC/processor 130 may also be referred to as a host and may include a host controller. A host may refer to a computing device coupled with other devices through any means of electronic communication (e.g., a bus, a link, a channel, or a wireless network). In the context of a memory system or sub-system, a host may be a computing device (e.g., central processing unit, graphics processing unit, microprocessor, application processor, baseband processor) coupled with one or more memory devices that collectively function as a main memory for the host. In some cases, SoC/processor 130 may perform some or all of the functions of interface controller 120 described herein.

SoC/processor 130 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some cases, SoC/processor 130 may include a baseband processor that manages radio functions of device 105 in a wireless network environment. In some examples, a separate chip (e.g., a separate chip other than the chip including SoC/processor 130) may include the baseband processor and be coupled with bus 110. The baseband processor may adjust its operational mode as a part of an overall operational scheme of device 105. For example, the baseband processor may change its data transfer rate (e.g., data rate for transmitting or receiving a stream of data over a wireless network) when a memory component (e.g., memory device 180) transmits an indication of a time delay associated with an access command from SoC/processor 130.

Memory devices 170 may each include an array or arrays of memory cells to store digital information. Memory devices 170 may be configured to each operate with SoC/ processor 130 and/or interface controller 120. In some examples, memory devices 170 may be configured to provide buffer memory for a memory bank for SoC/processor 130 or interface controller 120. In some cases, memory devices 170 may include an array of non-volatile memory cells. Device 105 may include any number of memory devices 170.

Memory device 175 may include an array of memory cells and a local memory controller configured to operate with the array of memory cells. In some cases, memory devices 175 may include an array of non-volatile memory cells. The array of memory cells included in memory device 175 may be structured in two or more tiers each having different performance capabilities. The local memory controller of memory device 175 may also be configured to operate with SoC/processor 130 or interface controller 120. First-tier memory cells may be 3D XPoint™ memory, which may provide a high number of input/output operations per second (IOPS) with a short response time to handle various workloads.

Second-tier memory cells may be three-dimensional Not-AND (NAND) memory, which may provide high capacity for data storage at a relatively lower cost than the first-tier memory cells. The local memory controller of memory device 175 may be configured to facilitate the efficient operation of memory cells within memory device 175, which may have different characteristics among memory cells in the two or more tiers, with SoC/processor 130. Memory device 175 may include other types or combinations of memory arrays. In some examples, one or more memory devices 175 may be present in device 105.

Memory devices 180 may include one or more arrays of memory cells and a local memory controller configured to operate with the one or more arrays of memory cells. The local memory controller of memory device 180 may also be configured to operate with SoC/processor 130 or interface controller 120. A memory device 180 may include non-volatile memory cells, volatile memory cells, or a combination of both non-volatile and volatile memory cells. A non-volatile memory cell (e.g., an FeRAM memory cell) may maintain its stored logic state for an extended period of time in the absence of an external power source, thereby reducing or eliminating requirements to perform refresh operations (e.g., refresh operations such as those associated with DRAM cells). In some examples, one or more memory devices 180 may be present in device 105.

In some examples, a memory device (e.g., a local memory controller of memory device 175 or 180) may transmit an indicator of a size of prefetch data associated with data requested by interface controller 120, which may be referred to as a prefetch indicator signal. The size of prefetch data may be equal to or different than the size of the requested data subject to a read command by the interface controller 120. The memory device may transmit a prefetch indicator signal using a pin compatible with an industry standard or specification (e.g., a JEDEC LPDDR specification). In some cases, a separate pin (e.g., RSP pin) of the memory device may be configured for transmitting command or control information to the interface controller 120, and the memory device may use the separate pin to transmit the prefetch indicator signal to the interface controller 120. In other words, the memory device may identify an indicator of a size of prefetch data associated with the requested data and inform the interface controller 120 of the size of prefetch data while (e.g., concurrently with) transmitting the requested data to the interface controller 120.

The inclusion of an array of non-volatile memory cells (e.g., FeRAM memory cells) in a memory device (e.g., memory devices 170, 175, or 180) may provide various benefits (e.g., efficiency benefits) for device 105. Such benefits may include near-zero standby power (which may increase battery life), instant-on operation following a standby or un-powered (e.g., "off") state, and/or high areal memory density with low system power consumption relative to an array of volatile memory cells. Such features of non-volatile memory system or sub-system may, for example, support the use of computationally intensive (e.g., desktop applications) operations or software in mobile environments. In some cases, device 105 may include multiple kinds of non-volatile memory arrays employing different non-volatile memory technologies, such as one or more FeRAM arrays along with one or more non-volatile memory arrays using other memory technologies. Further, the benefits described herein are merely exemplary, and one of ordinary skill in the art may appreciate further benefits.

In some cases, a memory device (e.g., memory devices 170, 175, or 180) may use a different page size than SoC/processor 130. In the context of a memory device, a page size may refer to a size of data handled at various interfaces, and different memory device types may have different page sizes. In some examples, SoC/processor 130 may use a DRAM page size (e.g., a page size in accord with one or more JEDEC low power double data rate (LPDDR) specifications), and a memory device within device 105 may include an array of non-volatile memory cells that are configured to provide a different page size (e.g., a page size smaller than a typical DRAM page size). In some examples, a memory device may support a variable page size—e.g., a memory device may include an array of non-volatile memory cells (e.g., an FeRAIVI array) that supports multiple page sizes, and the page size used may vary from one access operation to another—and in some examples, the local memory controller of a memory device (e.g., memory device 175 or 180) may be configured to handle a variable page size for a memory array within the memory device. For example, in some cases, a subset of non-volatile memory cells connected to an activated word line may be sensed simultaneously without having to sense all non-volatile memory cells connected to the activated word line, thereby supporting variable page-size operations within a memory device. In some cases, the page size for an array of non-volatile memory cells may vary dynamically depending on the nature of an access command and a characteristic of (e.g., size or associated latency) associated data (e.g., data subject to the access command). Smaller page size may provide benefits (e.g., efficiency benefits) as a smaller number of memory cells may be activated in connection with a given access operation. The use of variable page size may provide further benefits to device 105, such as configurable and efficient energy usage when an operation is associated with a small change in information by reducing the page size while supporting a high-performance operation by increasing the page size when desired.

DMAC 155 may support direct memory access (e.g., read or write) operations by SoC/processor 130 with respect to memory devices 170, 175, or 180. For example, DMAC 155 may support access by SoC/processor 130 of a memory device 170, 175, or 180 without the involvement or operation of interface controller 120.

Peripheral component(s) 150 may include any input or output device, or an interface for any such device, that may be integrated into device 105. Examples of such peripheral component(s) 150 may include disk controllers, sound controllers, graphics controllers, Ethernet controllers, modems, universal serial bus (USB) controllers, serial or parallel ports, or peripheral card slots, such as peripheral component interconnect (PCI) or accelerated graphics port (AGP) slots. In some cases, peripheral component(s) 150 may include a component (e.g., a control component) that determines an operational mode of device 105 (e.g., a power usage mode, a clock frequency mode). In some cases, the component may include a power-management integrated circuit (PMIC) that provides power to device 105. For example, the component may be an operation mode manager for the device 105 that determines a level of power usage associated with some aspects of the device 105 operations. For example, the operation mode manager may change a power usage level for the device 105 (e.g., by activating or deactivating, or adjusting an operation mode, of one or more aspects of device 105) when a memory component (e.g., memory device 180) transmits an indication of a time delay associated with an access command from SoC/processor 130. In some cases, a PMIC may increase or decrease voltage or current supply levels to device 105 (e.g., to interface controller 120, memory devices 170, 175, or 180) to support an increase or decrease in a bandwidth requirement of device 105. In some cases, the component may receive signals associated with a change in operating clock frequency of interface controller 120. Peripheral component(s) 150 may also include other components or interfaces for other components understood by those skilled in the art as peripherals.

BIOS component 140 or board support package (BSP) 145 may be software components that include a basic input/output system (BIOS) operated as firmware, which may initialize and run various hardware components of system 100. BIOS component 140 or BSP 145 may also manage data flow between SoC/processor 130 and the various components, e.g., peripheral component(s) 150, input/output controller 135, etc. BIOS component 140 or BSP 145 may include a program or software stored in read-only memory (ROM), flash memory, or any other non-volatile memory. In some cases, BIOS component 140 and BSP 145 may be combined as a single component.

Input/output controller 135 may manage data communication between SoC/processor 130 and other devices, including peripheral component(s) 150, input devices 160, or output devices 165. Input/output controller 135 may also manage peripherals that are not integrated into device 105. In some cases, input/output controller 135 may include a physical connection or port to the external peripheral.

Input device 160 may represent a device or signal external to device 105 that provides input to device 105 or its components. Input device 160 may include a user interface or an interface with or between other devices (not shown in FIG. 1). In some cases, input device 160 may be a peripheral that interfaces with device 105 via peripheral component(s) 150 or is managed by input/output controller 135.

Output device 165 may represent a device or signal external to device 105 that is configured to receive output from device 105 or any of its components. For example, output device 165 may include a display, audio speakers, a printing device, or another processor on printed circuit board, etc. In some cases, output device 165 may be a peripheral that interfaces with device 105 via peripheral component(s) 150 or is managed by input/output controller 135.

The components of device 105 may be made up of general purpose or specialized circuitry designed to carry out their respective functions. This may include various circuit elements, for example, conductive lines, transistors, capacitors, inductors, resistors, amplifiers, or other active or passive elements configured to carry out the functions described herein.

Figure 2:
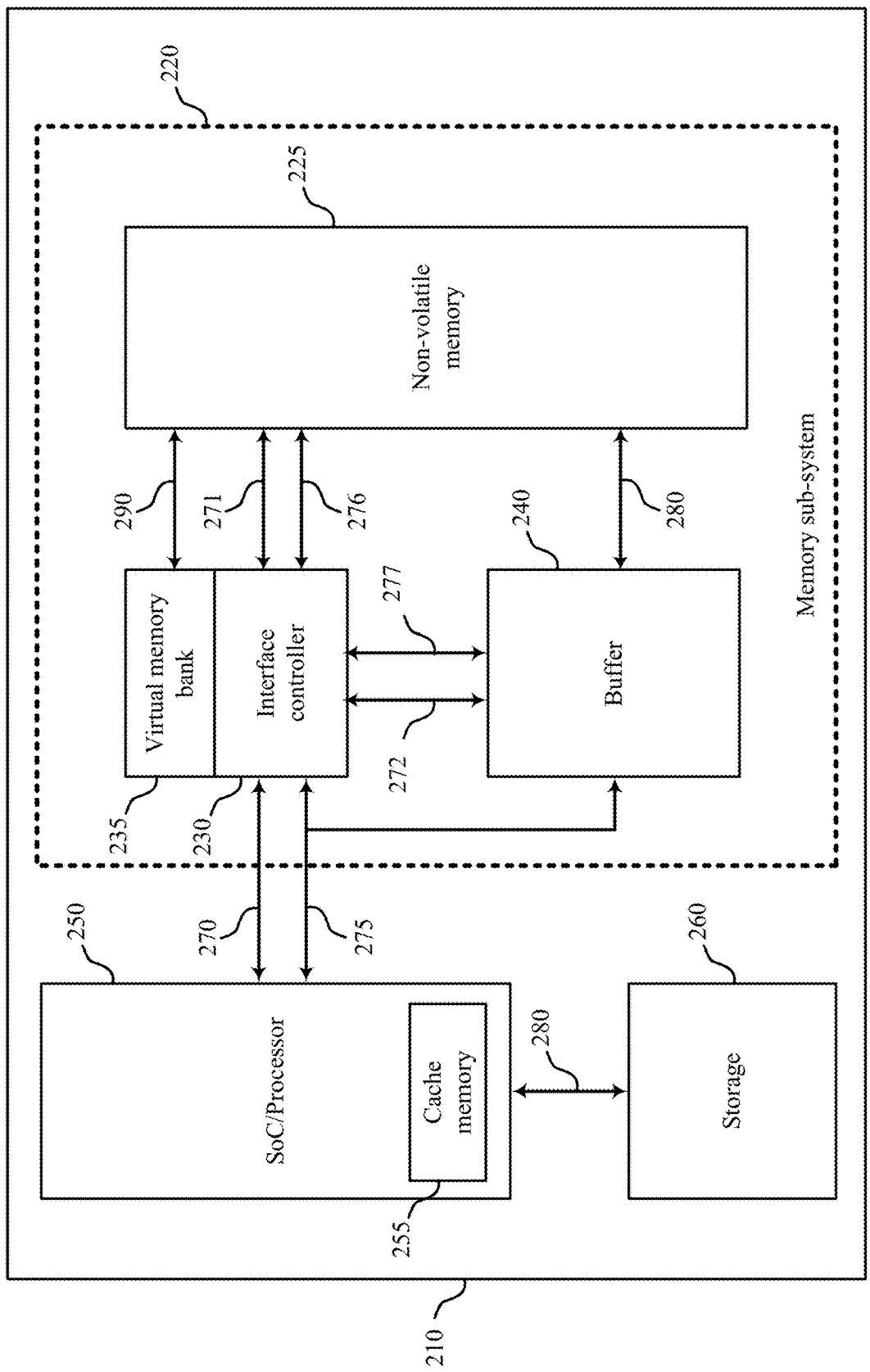
FIG. 2 illustrates an exemplary memory system or sub-system that supports prefetch signaling in a memory system or sub-system in accordance with examples of the present disclosure.

FIG. 2 illustrates an exemplary system that supports prefetch signaling in a memory system or sub-system in accordance with examples of the present disclosure. System 200 may include aspects of system 100 as described with reference to FIG. 1 and may include a device 210. Device 210 may include aspects of device 105 as described with reference to FIG. 1. Device 210 may include memory system or sub-system 220, SoC/processor 250, and storage 260. SoC/processor 250 may be an example of an SoC/processor 130 as described with reference to FIG. 1. Memory sub-system 220 may include aspects of a memory device 180 as described with reference to FIG. 1 as well as other aspects of a device 105 as described with reference to FIG. 1. Storage 260 may be an example of a memory device 175 as described with reference to FIG. 1.

SoC/processor 250 (e.g., a host) may be configured to operate with storage 260 via a bus 280 and with memory sub-system 220 via buses 270 and 275. In some examples, bus 280 may be configured to support periphery component interconnect express (PCIe) signaling. Bus 270 may be configured to support LPDDR command and address (CA) signaling, and bus 275 may be configured to support LPDDR input/output (I/O) signaling. In some examples, a local memory array may be disposed on a same substrate as SoC/processor 250 and may be configured to function as a cache memory 255 for SoC/processor 250.

Memory sub-system 220 may include non-volatile memory 225 and interface controller 230. Memory sub-system 220 and non-volatile memory 225 may each be referred to as a memory device or memory devices. Non-volatile memory 225 may be an example of a memory device (e.g., memory devices 170, 175, or 180) as described with reference to FIG. 1. Interface controller 230 may be an example of an interface controller 120 as described with reference to FIG. 1. Interface controller 230 may be configured to operate with SoC/processor 250 via buses 270 and 275 pursuant to one or more LPDDR specifications (e.g., page size, timing requirements). Interface controller 230 may include virtual memory bank 235, which may be an example of a memory device 170 as described with reference to FIG. 1. In some examples, virtual memory bank 235 may include DRAM memory cells and may be configured to operate pursuant to an LPDDR specification. Virtual memory bank 235 may be disposed on a same substrate as interface controller 230. In addition, interface controller 230 may be configured to operate with non-volatile memory 225 via buses 271 and 276. In some cases, interface controller 230 may be configured to perform some functions ascribed herein to non-volatile memory 225 (e.g., to a local memory controller of non-volatile memory 225).

In some examples, memory sub-system 220 may further include buffer 240. Buffer 240 may include DRAM memory cells. Buffer 240 may be an example of a memory device 170 or a memory device 180 as described with reference to FIG. 1. In addition, interface controller 230 may be configured to operate with buffer 240 via buses 272 and 277. In some examples, bus 272 may be a buffer CA bus. Bus 277 may be an interface (IF) buffer I/O bus. Interface controller 230 and buses 272 and 277 may be compatible with DRAM protocols. For example, interface controller 230 and buses 272 and 277 may utilize LPDDR page sizes and timings. SoC/processor 250 may be configured to directly operate with buffer 240 via bus 275. In some examples, buffer 240 may be configured to have a page size compatible with bus 275, which may support direct access of buffer 240 by SoC/processor 250.

Buffer 240 may be configured to operate as a logical augmentation of cache memory 255 within SoC/processor 250. The capacity of buffer 240 may be on the order of 256 Megabytes. The capacity of buffer 240 may be based at least in part on the size of cache memory 255 in SoC/processor 250. For example, the capacity of buffer 240 may be relatively large when the size of cache memory 255 is relatively small, or vice versa. In some cases, buffer 240 may have a relatively small capacity, which may facilitate improved (e.g., faster) performance of memory sub-system 220 relative to a DRAM device of a larger capacity due to potentially smaller parasitic components, e.g., inductance associated with metal lines. A smaller capacity of buffer 240 may also provide benefits in terms of reducing system power consumption associated with periodic refreshing operations.

Memory sub-system 220 may be implemented in various configurations, including one-chip versions and multi-chip versions. A one-chip version may include interface controller 230, virtual memory bank 235, and non-volatile memory 225 on a single chip. In some examples, buffer 240 may also be included in the single-chip. In contrast, a multi-chip version may include one or more constituents of memory sub-system 220, including interface controller 230, virtual memory bank 235, non-volatile memory 225, and buffer 240, in a chip that is separate from a chip that includes one or more other constituents of memory sub-system 220. For example, in one multi-chip version, respective separate chips may include each of interface controller 230, virtual memory bank 235, and non-volatile memory 225. As another example, a multi-chip version may include one chip that includes both virtual memory bank 235 and interface controller 230 and a separate chip that includes buffer 240. Additionally, a separate chip may include non-volatile memory 225.

Another example of a multi-chip version may include one chip that includes both buffer 240 and virtual memory bank 235. Additionally, a separate chip may include both interface controller 230 and non-volatile memory 225 or respective separate chips may include each of interface controller 230 and non-volatile memory 225. In yet another example of a multi-chip version, a single chip may include non-volatile memory 225 and buffer 240. Additionally, a separate chip may include both interface controller 230 and virtual memory bank 235 or respective separate chips may include each of interface controller 230 and virtual memory bank 235. Non-volatile memory 225 may include both an array of non-volatile memory cells and an array of DRAM cells. In some cases of a multi-chip version, interface controller 230, virtual memory bank 235, and buffer 240 may be disposed on a single chip and non-volatile memory 225 on a separate chip.

In some examples, non-volatile memory 225 may include an array of non-volatile memory cells (e.g., FeRAM memory cells). The non-volatile array included in non-volatile memory 225 may be configured to support variable page sizes, which may in some cases differ from a page size associated with SoC/processor 250. Further, non-volatile memory 225 may be configured to determine a variable page size for non-volatile memory 225. Non-volatile memory 225 may be referred to as a non-volatile near memory to SoC/processor 250 (e.g., in comparison to storage 260). In the context of a memory system, a near memory may refer to a memory component placed near SoC/processor 250, logically and/or physically, to provide a faster access speed than other memory components. Configuring non-volatile memory 225 as a near memory for SoC/processor 250 may, for example, limit or avoid overhead that may be associated with SoC/processor 250 retrieving data from storage 260. SoC/processor 250 may store critical information in non-volatile memory 225 upon occurrence of an unexpected power interruption—e.g., instead of accessing storage 260, as accessing storage 260 may be associated with an undesired delay. In some cases, non-volatile memory 225 may include a local memory controller (not shown), which may facilitate various operations in conjunction with interface controller 230 or perform some functions ascribed herein to non-volatile memory 225.

Interface controller 230 may be configured to operate with non-volatile memory 225 via buses 271 and 276. In some examples, bus 271 may be an FeRAM CA bus, and bus 276 may be an FeRAM interface (IF) bus. Interface controller 230 and buses 271 and 276 may be compatible with the page size of non-volatile memory 225. In some examples, bus 280 may be configured to facilitate data transfer between buffer 240 and non-volatile memory 225. In some examples, bus 290 may be configured to facilitate data transfer between non-volatile memory 225 and virtual memory bank 235.

Interface controller 230 may support low latency or reduced power operation (e.g., from the perspective of SoC/processor 250) by leveraging virtual memory bank 235 or buffer 240. For example, upon receiving a read command from SoC/processor 250, interface controller 230 may attempt to retrieve requested data from virtual memory bank 235 or buffer 240 for transmission to SoC/processor 250. If data subject to the read command is not present in virtual memory bank 235 or buffer 240, interface controller 230 may retrieve data from non-volatile memory 225 to store the data in virtual memory bank 235 and also (e.g., concurrently) send the data to SoC/processor 250.

Interface controller 230 may manage operations of virtual memory bank 235. For example, interface controller 230 may use a set of flags located in virtual memory bank 235 to identify portions of virtual memory bank 235 storing valid data from non-volatile memory 225. As another example, upon receiving a write command from SoC/processor 250, interface controller 230 may store data at virtual memory bank 235.

Another set of flags located in virtual memory bank 235 may indicate which portions of virtual memory bank 235 store valid data that are modified from corresponding contents of non-volatile memory 225. Valid data stored at virtual memory bank 235 may include data that has been retrieved from non-volatile memory 225 pursuant to a read command from SoC/processor 250 or data that has been received from SoC/processor 250 as a part of write command. In some cases, invalid data present at virtual memory bank 235 may include a set of filler data (e.g., a sequence of "0" or "1" without representing meaningful information). Flags indicating which portions of virtual memory bank 235 store valid data or modified data may support interface controller 230 in saving only the data that has been modified from the corresponding contents in non-volatile memory 225. Furthermore, interface controller 230 may determine where to store data upon removal of the data from virtual memory bank 235 (e.g., when SoC/processor 250 no longer needs the data). Interface controller 230 may monitor and identify the contents of virtual memory bank 235.

In some cases, interface controller 230 may include a counter that records a number of access attempts by SoC/processor 250 to the contents of virtual memory bank 235 during a certain time interval. By way of example, if the counter shows that the number of access attempts by SoC/processor 250 during the time interval is less than a pre-determined threshold value, then upon removal of the data from virtual memory bank 235, interface controller 230 may store modified data (that is, data that was modified by the access attempts by SoC/processor 250) in non-volatile memory 225, as the interface controller 230 may anticipate, based on the relatively low number of prior access attempts, that SoC/processor 250 is not likely to access the data again for some duration of time.

Or, if the counter indicates that the number of access attempts by SoC/processor 250 during the time interval is equal to or larger than the pre-determined threshold value, then interface controller 230 may, upon removal of the data from virtual memory bank 235, store the data in buffer 240, as the interface controller 230 may anticipate that SoC/processor 250 is likely to access the data again soon. One skilled in the art may, in view of overall system requirements, devise various criteria (e.g., criteria including the threshold value of the counter, a clock, a value of the time interval, etc.) for interface controller 230 to use in making such determinations.

In addition, interface controller 230 may set up a by-pass indicator based on the counter when the number of access attempts by SoC/processor 250 is less than the pre-determined threshold value in order to by-pass saving the contents of virtual memory bank 235 to buffer 240. Then, interface controller 230 may directly save the modified contents of virtual memory bank 235 to non-volatile memory 225 based on the by-pass indicator. In some cases, upon removal of the data from virtual memory bank 235, interface controller 230 may determine that the data has not been modified since it was last retrieved from non-volatile memory 225 and may, based on that determination, discard the data (e.g., not write the data to either buffer 240 or non-volatile memory 225).

Additionally, interface controller 230 may prefetch data from non-volatile memory 225 by transmitting a read command for a first set of data to local memory controller 226. The local memory controller 226 may, upon receiving the read command, identify a size of a second set of data to be prefetched (e.g., a prefetch size), which includes the first set of data. The local memory controller 226 may transmit an indicator of the prefetch size (e.g., a prefetch indicator signal) to the interface controller 230 while transmitting the second set of data in order to inform the interface controller 230 whether the prefetch size is greater than the first set of data (e.g., the second set of data may include the first set of data as well as an additional set of data).

In some cases, transmitting the entire prefetched data may be associated with a time delay (e.g., a read latency associated with activating a portion of memory array to retrieve the additional set of data). In such cases, the local memory controller 226 may signal the interface controller 230 to transmit a subsequent read command for a remaining portion of the second set of data after a predetermined delay.

Figure 3:
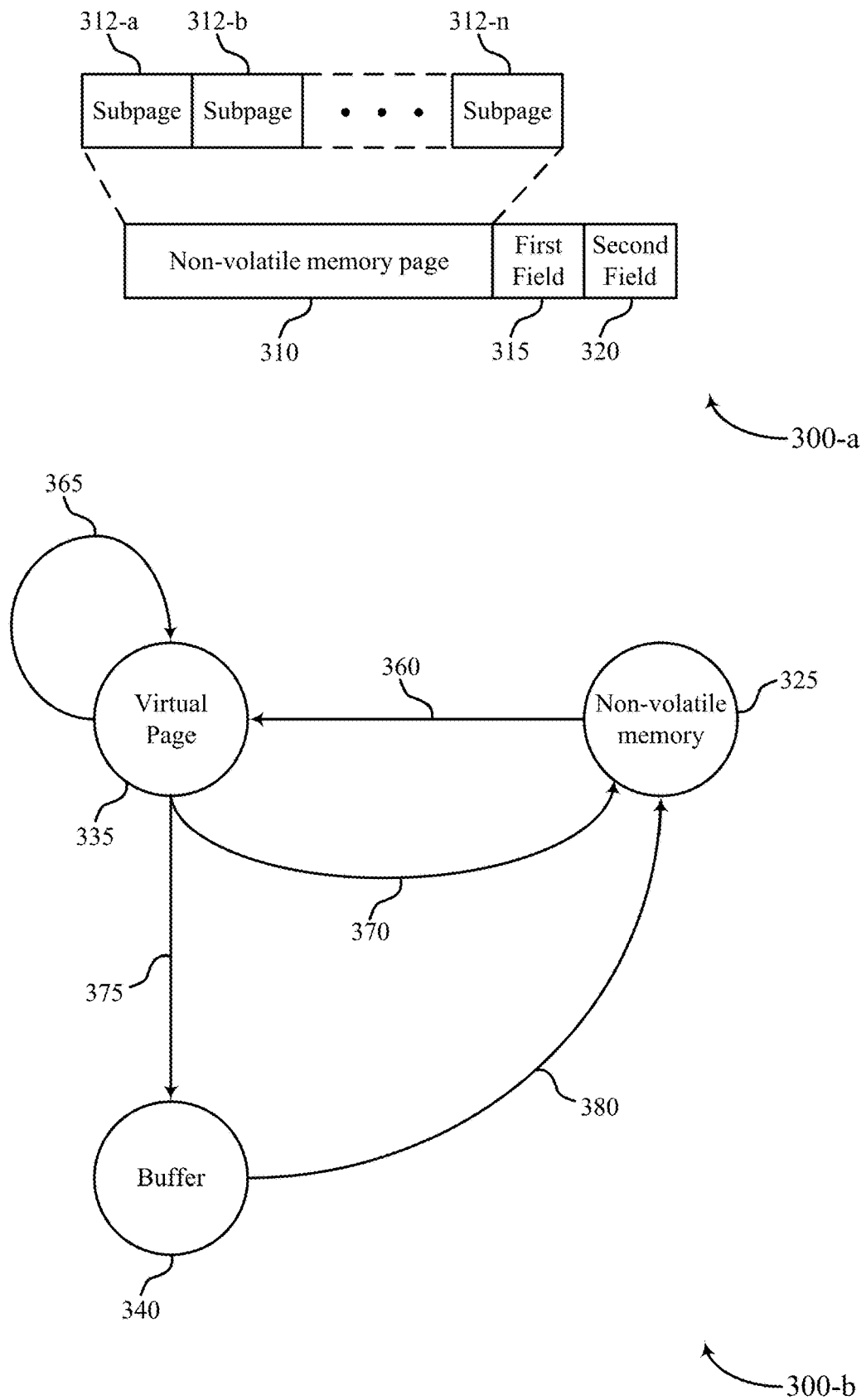
FIG. 3 illustrates an exemplary data structure and state diagram that support prefetch signaling in a memory system or sub-system in accordance with examples of the present disclosure.

FIG. 3 illustrates an example of a data structure 300-a and a state diagram 300-b that support prefetch signaling in a memory system or sub-system in accordance with examples of the present disclosure. Data structure 300-a illustrates a non-volatile memory page 310, a first field 315, and a second field 320. In some examples, the non-volatile memory page 310 may be 128 or 256 bytes. In some examples, a memory device (e.g., non-volatile memory 225 as described with reference to FIG. 2, not shown in FIG. 3) may utilize data structure 300-a. In some examples, an interface controller (e.g., interface controller 120 or interface controller 230 as described with reference to FIGS. 1 and 2, not shown in FIG. 3) may perform or manage various operations (e.g., operations 360 through 380) of state diagram 300-b. In some cases, a local memory controller of a memory device (e.g., of non-volatile memory 225 as described with reference to FIG. 2, not shown in FIG. 3) may facilitate various operations in conjunction with the interface controller.

The non-volatile memory page 310 may include a plurality of subpages 312. An interface controller (or an interface controller in conjunction with a local memory controller of non-volatile memory, in some cases) may activate each of the plurality of subpages (e.g., 312-a) independent of other subpages (e.g., 312-b through 312-n) in order to facilitate an energy-efficient page size management. In some examples, the first field 315 and the second field 320 may be stored in a portion of a memory array that is physically located closer to the interface controller (or the local memory controller, in some cases) than the non-volatile memory page 310. The physical proximity of the first field 315 and the second field 320 to the interface controller (or the local memory controller, in some cases) may reduce a delay time associated with activating the first field 315 or the second field 320 (e.g., a delay time to charge a word line associated with a group of memory cells) and retrieving the contents therefrom.

Thus, the portion of memory array corresponding to the first field 315 or the second field 320 may exhibit an access speed faster than a nominal access speed, which may correspond to the access speed of other portions of memory array corresponding to the non-volatile memory page 310. In some cases, an interface controller (e.g., interface controller 230 described with reference to FIG. 2) may specify the portion of memory array having the faster access speed when storing the contents of the first field 315 and the second field 320 in the non-volatile memory. In some cases, a local memory controller may specify the portion of memory array having the faster access speed when storing the contents of the first field 315 and the second field 320.

In some examples, the first field 315 may be configured to indicate (and may be updated to track) a number of times a corresponding non-volatile memory page 310 has been accessed (e.g., read or write) by an SoC/processor (e.g., SoC/processor 250 described with reference to FIG. 2). The first field 315 may be referred to as a saturating counter (SC). The first field 315 may include two bits of information, but it is to be understood that any number of bits may be used in accordance with the teachings herein.

In some examples, the second field 320 may be configured to indicate a size of data in a corresponding non-volatile memory page 310 to be retrieved upon receiving a read command. An interface controller may determine the size of data based on an access pattern to the data made by an SoC/processor in one or more previous access operations and may be referred to as a prefetch size in some cases. A prefetch size may be an amount of data that is to be read in response to a read command for data included in the non-volatile memory page 310. For example, if data from the non-volatile memory page 310 is subject to a read command (e.g., a read command from the interface controller 230 accessing the non-volatile memory page 310, anticipating an access from an SoC/processor), the interface controller (or the interface controller in conjunction with a local memory controller, in some cases) may identify the associated second field 320 and may determine a prefetch size for the requested data based on the associated second field 320, where the prefetch size indicates a size of data (that includes and thus is at least as large as the requested data) to be read from the non-volatile memory 225 in response to the read request.

In some examples, logic states stored in the second field 320 may indicate a prefetch size of the corresponding non-volatile memory page 310. For example, "00" may correspond to 64 bytes, "01" may correspond to 128 bytes, "01" may correspond to 192 bytes, and "11" may correspond to 256 bytes. In such an example, if a read command requests 64 bytes of data from a non-volatile memory page 310, and the associated second field 320 is 01, then the interface controller (or the interface controller in conjunction with a local memory controller, in some cases) may identify the prefetch size for the requested data as 192 bytes and read from the non-volatile memory 225 192 bytes of data, where the 192 bytes includes the requested 64 bytes. It is to be understood that the second field 320 may include any number of bits supporting any number of logic states and may indicate prefetch sizes of any size. In some examples, the second field 320 may be referred to as a prefetch (PF) counter.

In some examples, an interface controller (e.g., interface controller 230 described with reference to FIG. 2, not shown in FIG. 3) may use a set of mode register bits to facilitate the SC and PF counter functionality of a non-volatile memory (e.g., non-volatile memory 225 described with reference to FIG. 2). Mode registers may establish various operation modes (e.g., different test modes, different read or write modes, different performance modes) of a memory device and a set of bits associated with mode registers, which may be referred to as mode register bits, may be used to determine a particular mode of operation.

An interface controller may access the contents of the SC and PF counter using a data mask inversion (DMI) pin along with data during a read operation. In some examples, an interface controller may write the contents of the SC and PF counter with a special command sequence. For example, an interface controller may provide the contents of SC and PF counter to registers associated with the SC and PF counter via column address pins during a write command issued to a non-volatile memory (e.g., non-volatile memory 225 described with reference to FIG. 2).

Diagram 300-b illustrates exemplary operational characteristics of a memory system or sub-system that support features and techniques as described herein. Diagram 300-b illustrates non-volatile memory 325, virtual page 335, and buffer 340. Non-volatile memory 325 may be an example of non-volatile memory 225 described with reference to FIG. 2. Virtual page 335 may be a page within virtual memory bank 235 described with reference to FIG. 2.

In some examples, virtual memory bank 235 may be a superset of multiple virtual pages 335. Buffer 340 may be an example of buffer 240 described with reference to FIG. 2. An interface controller (e.g., interface controller 230 described with reference to FIG. 2, not shown in FIG. 3) may perform or manage various operations (e.g., operations 360 through 380) associated with non-volatile memory 325, virtual page 335, and buffer 340. In some cases, an interface controller may manage an operation by requesting another entity (e.g., a local memory controller of a memory device) to perform the operation.

Operation 360 may include transmitting the contents of a non-volatile memory page 310 from non-volatile memory 325 to virtual page 335 and storing the contents in virtual page 335. The interface controller may carry out operation 360 when an SoC/processor requests data corresponding to the contents of non-volatile memory page 310 that is not present either in the virtual page 335 or the buffer 340.

Additionally, the interface controller may, as part of operation 360, update a value of the first field 315 (e.g., a value of SC) associated with the non-volatile memory page 310, in order to track a number of access events by the SoC/processor for the non-volatile memory page 310.

The interface controller may as part of operation 360 prefetch data from non-volatile memory 325 by transmitting a read command for a first set of data. Non-volatile memory 325 (e.g., a local memory controller of non-volatile memory 325) may transmit the first set of data as requested by the interface controller during operation 360 where the first set of data is transmitted using a signal over a pin designated for transmitting data (e.g., signal 410 described with reference to FIG. 4). In some cases, non-volatile memory 325 (e.g., a local memory controller of non-volatile memory 325) may transmit the first set of data over bus 271 described with reference to FIG. 2 in response to the read command received from the interface controller.

In addition to transmitting the first set of data, non-volatile memory 325 (e.g., a local memory controller of non-volatile memory 325) may transmit an indicator of a prefetch size (e.g., prefetch indicator signal) to the interface controller in order to inform the interface controller of the prefetch size before completing transmission of the first set of data. The prefetch size may be equal to or different from the size of first set of data requested by the interface controller. In some cases, the prefetch data may include an additional set of data accompanying the first set of data. Non-volatile memory 325 may transmit the prefetch indicator signal (e.g., signal 415 described with reference to FIG. 4) over a pin that is compatible with an LPDDR specification (e.g., a DMI pin, a link ECC parity pin). Non-volatile memory 325 may transmit the prefetch indicator signal (e.g., signal 420 described with reference to FIG. 4) over a separate pin configured for transmitting command or control information. In some cases, the separate pin may be referred to as a response (RSP) pin. Non-volatile memory 325 may transmit such a prefetch indicator signal over bus 276 described with reference to FIG. 2 in response to a read command received from the interface controller.

The interface controller may perform operation 365 when data requested by an SoC/processor (e.g., subject to a read command sent to the interface controller by the SoC/processor) is found in virtual page 335. As part of operation 365, the interface controller may retrieve the requested data from the virtual page 335 and provide the requested data to the SoC/processor without accessing either non-volatile memory 325 or buffer 340. Additionally, the interface controller may update a value of the first field 315 (e.g., a value of SC) associated with the data, in order to track a number of access events by the SoC/processor for the non-volatile memory page 310.

The interface controller may perform operation 370 when a page in virtual page 335 is closed and a value of the first field 315 (e.g., a value of SC) associated with the closed page does not satisfy a threshold value. Virtual page 335 may include one or more pages within virtual memory bank 235 described with reference to FIG. 2. The interface controller may determine to close a page in virtual page 335 when the SoC/processor no longer needs the data associated with the page. Upon determining to close a page in virtual page 335, the interface controller may remove the data to make the memory space corresponding to the page available for the SoC/processor.

In some cases, the interface controller may use a threshold value to determine how to dispose data from a closed page of virtual page 335. In some examples, when a value corresponding to first field 315 (e.g., a value of SC) is less than the threshold value, the interface controller may bypass saving data from a closed page to buffer 340. Instead, the interface controller may store any modified data from the closed page in non-volatile memory 325 and discard any unmodified data from the closed page. In such cases, the interface controller may determine whether data from a closed page include a portion that the SoC/processor has modified relative to corresponding data stored in non-volatile memory 325.

During operation 370, the interface controller may store any modified portion of the data of the closed page in non-volatile memory 325 from virtual page 335. Further, the interface controller may discard any unmodified data from a closed page after determining that the data has not been modified (that is, the interface controller may bypass storing an unmodified portion of the data in non-volatile memory 325). The interface controller may, in view of overall system requirements, determine the threshold value based on various criteria (e.g., a pre-determined value associated with a number of access to the page, a value of a time interval associated with lack of access to the page).

The interface controller may perform operation 375 when the interface controller determines to close a page in virtual page 335 and determines that a value of the first field 315 (e.g., a value of SC) associated with the closed page satisfies the threshold value described above. In some examples, when a value of the first field 315 (e.g., a value of SC) is equal to or greater than the threshold value, the interface controller may save data from a closed page to buffer 340, as the interface controller may determine that the SoC/processor is likely to access the data soon. As such, as a part of operation 375, the interface controller may store data from the closed page in buffer 340.

The interface controller may perform operation 380 when it evicts a page from buffer 340. The interface controller may determine to evict a page from buffer 340 when the page is not accessed by the SoC/processor for a predetermined duration. In some cases, data from an evicted page may include a portion that has been modified by the SoC/processor relative to corresponding data stored in non-volatile memory 325. In such cases, as a part of operation 380, the interface controller may store only a modified portion of the evicted data in non-volatile memory 325. Additionally, as part of operation 380, the interface controller may update (e.g., reset to zero) a value of the first field 315 (e.g., a value of the SC) associated with the evicted page. Further, the interface controller may discard data after determining that the data has not been modified (that is, the interface controller may bypass storing an unmodified portion of the evicted data in non-volatile memory 325).

The interface controller may also, as a part of operation 380, determine a prefetch size to associate with the evicted data and store the prefetch size along with the evicted data. The interface controller may determine the prefetch size of the data based at least in part on an access pattern (e.g., an amount of accessed data) to the data made by the SoC/processor while the data is present in buffer 340. In some cases, the interface controller may determine the prefetch size based on a history of an access pattern (e.g., a size of data) by the SoC/processor, an operation mode (e.g., a power conservation mode, a high performance mode), a bus speed of a memory system or sub-system, or any combination thereof.

When storing a value of PF counter (e.g., a prefetch size) in non-volatile memory 325, the interface controller may also designate a portion of memory cells in non-volatile memory 325 (e.g., memory cells corresponding to the second field 320) for storing the value of PF counter. For example, the interface controller may designate a portion of memory cells that exhibits a faster access speed than other portions of memory cells of the non-volatile memory 325, which may increase the speed with which the non-volatile memory 325 (e.g., a local memory controller of non-volatile memory 325) may determine the prefetch size of data associated with the PF counter. In turn, increasing the speed with which the non-volatile memory 325 may determine the prefetch size may facilitate the non-volatile memory 325 transmitting a signal related to the prefetch size (e.g., prefetch indicator signal) to the interface controller in a timely manner (e.g., while the requested data is being transmitted to the interface controller).

In some cases, the interface controller may dynamically update the value of the PF counter stored in the memory device based upon determining that a different access pattern to the data by the SoC/processor is established while the data is present in buffer 340. If the evicted data is not modified compared to the corresponding data stored in non-volatile memory 325, the interface controller may update the PF counter independent of storing the evicted data to non-volatile memory 325. In some cases, the interface controller may, as a part of operation 380, write an updated value of the PF counter in a register associated with the PF counter without activating a group of memory cells corresponding to the second field 320.

Figure 4A:
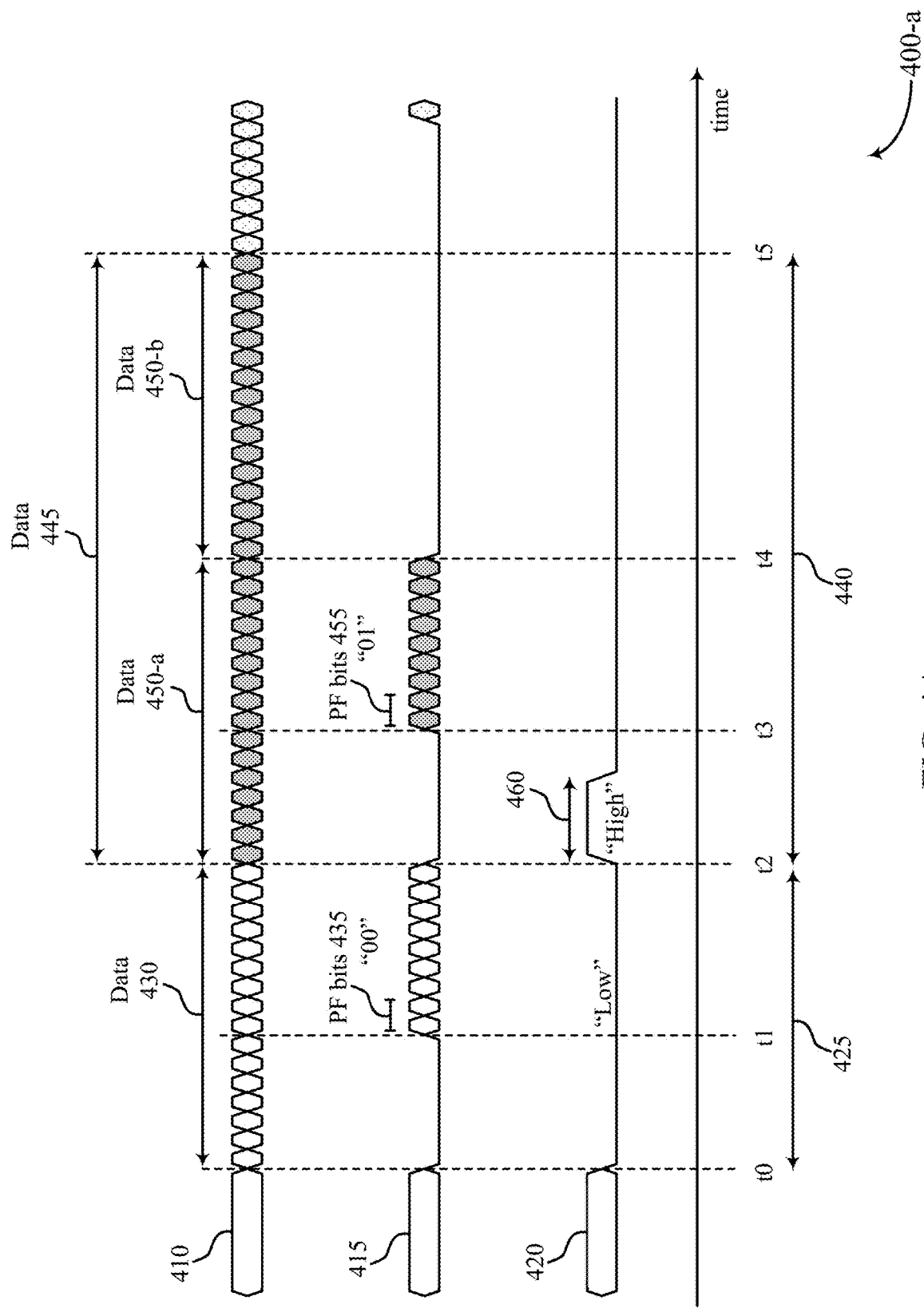
FIGS. 4A and 4B illustrate examples of timing diagrams that support prefetch signaling in a memory system or sub-system in accordance with examples of the present disclosure.

FIG. 4A illustrates an example of timing diagram 400-a that supports prefetch signaling in a memory system or sub-system in accordance with examples of the present disclosure. The timing diagram 400-a illustrate prefetch signaling procedures during a prefetch operation. The prefetch operation may include signals 410, 415, and 420, which a non-volatile memory (e.g., non-volatile memory 225 described with reference to FIG. 2) may transmit to an interface controller (e.g., interface controller 230 described with reference to FIG. 2). Although additional signals (e.g., clock signals, command signals) between the non-volatile memory and the interface controller may accompany the signals 410, 415, and 420 during the prefetch operation, they are omitted in FIG. 4A in an effort to increase visibility and clarity of the depicted features of prefetch signaling.

The non-volatile memory (e.g., a local memory controller of non-volatile memory 225) may transmit the signal 410 to the interface controller over a pin designated for transmitting data. The signal 410 may be an example of a signal transmitting data associated with operation 360 described with reference to FIG. 3. The non-volatile memory may transmit the signal 410 (e.g., data) over bus 271 described with reference to FIG. 2 in response to a read command received from the interface controller.

The non-volatile memory (e.g., a local memory controller of non-volatile memory 225) may transmit the signal 415 to the interface controller over a pin (e.g., a DMI pin, a link ECC parity pin) that is compatible with an LPDDR specification. In some examples, the non-volatile memory may transmit only one of the signal 415 or signal 420. The signal 415 may include a prefetch indicator signal (e.g., indicator of a prefetch size). The non-volatile memory may transmit the signal 415 as a part of operation 360 described with reference to FIG. 3. The non-volatile memory may transmit the signal 415 over bus 276 described with reference to FIG. 2 in response to a read command received from the interface controller. The signal 415 may include the contents of PF counter related to a prefetch size in some cases. The signal 415 may also include the contents of SC. The non-volatile memory may transmit the signal 415 to inform the interface controller whether there exists an additional set of data to be transmitted beyond the data currently being transmitted on the data pin (e.g., signal 410).

Additionally or alternatively to the signal 415, the non-volatile memory (e.g., a local memory controller of non-volatile memory 225) may transmit the signal 420 to the interface controller over a separate pin configured for transmitting command or control information. In some cases, the separate pin may be referred to as a response (RSP) pin. The non-volatile memory may transmit the signal 420 in lieu of transmitting the signal 415. The signal 420 may include a prefetch indicator signal (e.g., indicator of a prefetch size). The non-volatile memory may transmit the signal 420 as a part of operation 360 described with reference to FIG. 3. The non-volatile memory may transmit the signal 420 over bus 276 described with reference to FIG. 2 in response to a read command received from the interface controller. The signal 420 may include one or more pulses, and a number, a duration, or a pattern of the pulses that may be indicative of the contents of PF counter related to a prefetch size in some cases. The non-volatile memory may transmit the signal 420 to inform the interface controller whether there exists an additional set of data to be transmitted beyond the data currently being transmitted on the data pin (e.g., signal 410).

During duration 425 (e.g., time t0 through t2), the non-volatile memory may transmit data 430 using the signal 410 to the interface controller in response to receiving a read command for the data 430. For example, the data 430 may correspond to 64 bytes. Upon receiving the read command, the non-volatile memory (e.g., a local memory controller of non-volatile memory 225) may access a PF counter (e.g., second field 320 described with reference to FIG. 3) associated with the data 430 and determine a logic state stored in the PF counter. For example, the logic state of the PF counter may correspond to "00," which may indicate the prefetch size for the requested data as 64 bytes. At time t0, the non-volatile memory may transmit the data 430 (e.g., 64 bytes) using the signal 410. At time t1, the non-volatile memory may transmit an indicator of prefetch size (e.g., 64 bytes) using the signal 415. For example, the signal 415 may include two (2) bits (e.g., PF bits 435) corresponding to the logic state of the PF counter "00," which may indicate that the data 430 being transmitted using the signal 410 is the same size of data (e.g., 64 bytes) requested by the interface controller.

Based on the signal 415 received during duration 425, the interface controller may complete receiving the data 430 at time t2 and move on to a next operation without further monitoring the signal 410. It should be appreciated that the non-volatile memory may transmit the indicator (e.g., PF bits 435) using the signal 415 at time t1 such that the interface controller may receive the indicator of prefetch size before the transmission of the data 430 (e.g., using the signal 410) completes at time t2. In this manner, the interface controller may determine a next operation before completing reception of the data 430.

Additionally or alternatively to the signal 415, the non-volatile memory may, during duration 425, transmit to the interface controller an indicator of a prefetch size using the signal 420. For example, after determining that the data 430 being transmitted is the same size of data requested by the interface controller (that is, based on accessing the PF counter associated with data 430 indicating a prefetch size of 64 bytes), the non-volatile memory may maintain the signal 420 in a particular state (e.g., "low") during duration 425. The interface controller, by monitoring the signal 420, may identify that the non-volatile memory has not asserted signal 420 (e.g., based on the signal 420 remaining "low") and thus determine that the data 430 being transmitted using the signal 410 is the same size of data originally requested. Thus, the interface controller may complete receiving the data 430 at time t2 and move on to a next operation without further monitoring the signal 410.

During duration 440 (e.g., time t2 through t5), the non-volatile memory may transmit data 445 using the signal 410 to the interface controller in response to receiving a read command from the interface controller. As an example depicted in FIG. 4A, the data 445 may include two sets of data 450-a and 450-b. For example, the data 450-a and data 450-b may correspond to 64 bytes each. The read command from the interface controller may have requested for data 450-a or 450-b. Upon receiving the read command, the non-volatile memory (e.g., a local memory controller of non-volatile memory 225) may access the PF counter (e.g., second field 320 described with reference to FIG. 3) associated with the requested data 450-a (or data 450-b) and determine a logic state stored in the PF counter. For example, the logic state of the PF counter may correspond to "01," which may indicate the prefetch size for the requested data as 128 bytes.

At time t2, the non-volatile memory may transmit the data 445 that includes the data 450-a accompanied by the data 450-b using the signal 410. In some cases, the non-volatile memory (e.g., a local memory controller of non-volatile memory 225) may be configured to first transmit data specifically requested by the read command, and thus data 450-a may be a set of data specifically requested by the read command, and data 450-b may be additional data included in the prefetch set of data 445 that includes data 450-a. In other cases, a particular sequence of requested data (e.g., the requested data may be the data 450-a or 450-b) with respected to the other data in the data 445 may be of no consequence so long as the data 445 is a superset of data that includes the requested data, and the non-volatile memory (e.g., a local memory controller of non-volatile memory 225) may be configured to transmit the requested data and any additional data included in the prefetch set of data 445 on a first-available basis.

At time t3, the non-volatile memory may transmit, using the signal 415, an indicator of the prefetch size (e.g., prefetch indicator signal) associated with the prefetch size (e.g., 128 bytes) associated with the requested data. For example, the signal 415 may include the two (2) bits (e.g., PF bits 455) corresponding to the logic state of the PF counter "01," which may indicate that the data 445 being transmitted using the signal 410 includes a total of 128 bytes of data. Thus, the interface controller may complete receiving the data 450-a at time t4 (e.g., 64 bytes of data) and, based on receiving the prefetch indicator signal (e.g., the signal 415 indicating the prefetch size of 128 bytes), may continue to monitor the signal 410 such that the interface controller may complete receiving the data 450-b (e.g., another 64 bytes of data) at time t5 pursuant to the prefetch size (e.g., 128 bytes) indicated by the PF counter.

It is to be understood that the non-volatile memory may transmit the data 450-a and data 450-b in a sequence without a significant delay in-between. This may correspond to a situation where the data 450-a and data 450-b are available in one or more activated subpages (e.g., subpages 312 described with reference to FIG. 3) for retrieving data. As such, the non-volatile memory may retrieve and send both data 450-*a* and data 450-*b* during the duration 440 without an additional time delay (e.g., may send data 450-*b* immediately subsequent to sending data 450-*a*).

Additionally or alternatively to the signal 415, the non-volatile memory may, during duration 440, transmit to the interface controller an indicator of a prefetch size (e.g., prefetch indicator signal) using the signal 420. For example, after determining that the data 445 being transmitted corresponds to 128 bytes (that is, based on accessing the PF counter associated with the requested data 450-*a* or 450-*b* indicating a prefetch size of 128 bytes), the non-volatile memory may assert the signal 420 to a particular logic state for a certain duration (e.g., "high" during duration 460), or may otherwise indicate the prefetch size using a number, duration, or pattern of pulses on signal 420. The interface controller, by monitoring the signal 420, may identify that the non-volatile memory has asserted the signal 420 (e.g., "high" during duration 460) and thus determine that the data 445 being transmitted using the signal 410 corresponds to 128 bytes.

In some cases, the interface controller may make such a determination based on a length of duration asserted by the non-volatile memory (e.g., the duration 460). For example, the non-volatile memory (e.g., a local memory controller of non-volatile memory 225) may double duration 460 to indicate that the size of the data being transmitted is 256 bytes, instead of 128 bytes. In some cases, the non-volatile memory may make another assertion (e.g., a second pulse) following the duration 460 before time t4 (e.g., before completing transmission of data 450-*a*) to indicate a different size of data being transmitted (e.g., 192 bytes instead of 128 bytes). In yet another cases, the non-volatile memory may make an assertion using the signal 420 (e.g., bringing the signal 420 "high") while a first set of data (e.g., a first 64 bytes of data) is being transmitted so long as there exists a second set of data (e.g., a second 64 bytes of data) to follow the first set of data. The non-volatile memory makes various indications (e.g., prefetch indicator signal) using a pulse duration, a pulse count, a pulse pattern, or any combination thereof.

Figure 4B:
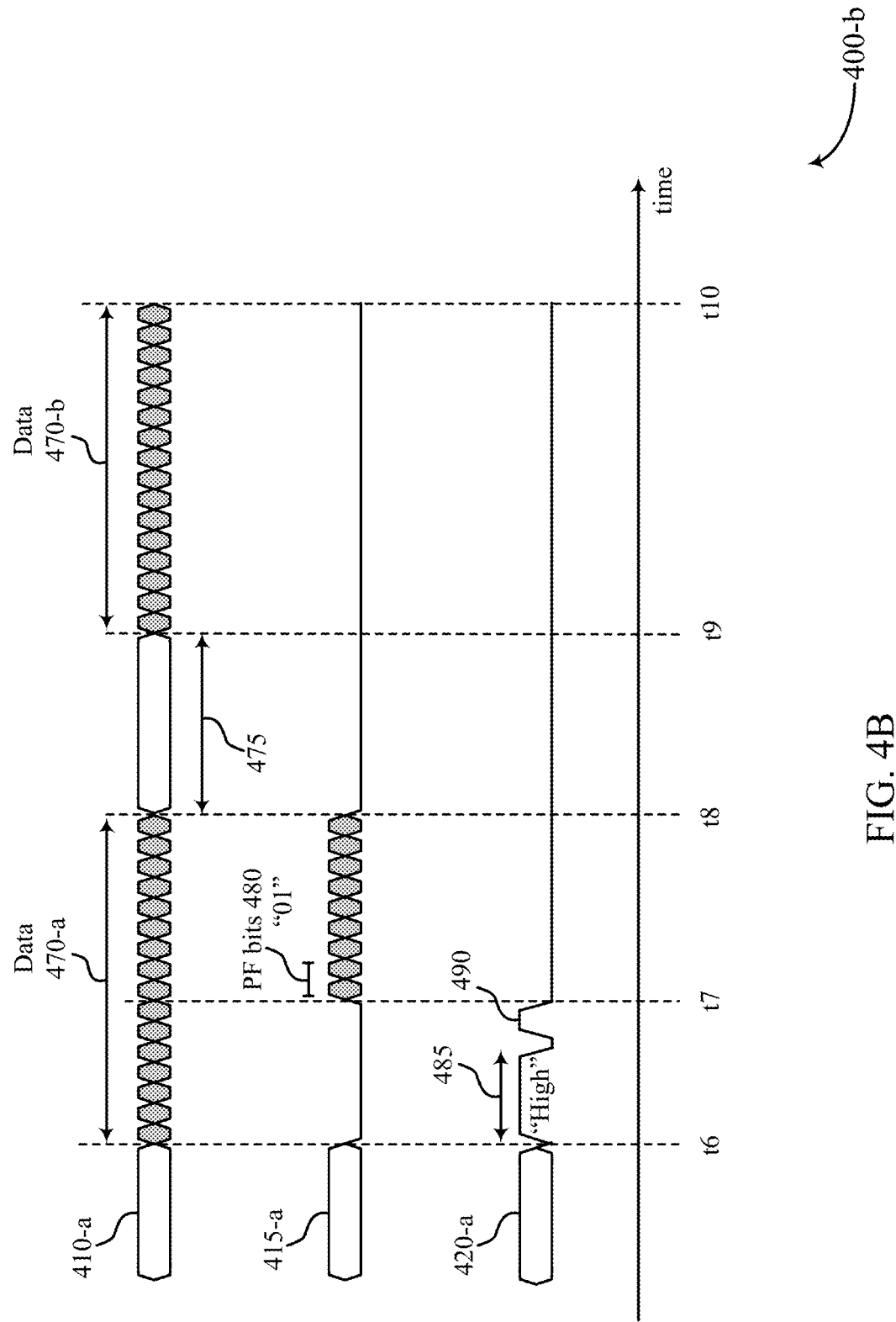

FIG. 4B illustrates an example of timing diagram 400-*b* that supports prefetch signaling in a memory system or sub-system in accordance with examples of the present disclosure. The timing diagram 400-*b* illustrates prefetch signaling procedures during a prefetch operation. The prefetch operation may include signals 410-*a*, 415-*a*, and 420-*a*, which correspond to the signals 410, 415, and 420 described with reference to FIG. 4A. Timing diagram 400-*b* illustrates a prefetch signaling procedure in which some portions of the data to be prefetched may be unavailable in one or more activated subpages for retrieving data in response to a read command from an interface controller. Although additional signals (e.g., clock signals, command signals) between the non-volatile memory and the interface controller may accompany the signals 410-*a*, 415-*a*, and 420-*a* during the prefetch operation, they are omitted in FIG. 4B in an effort to increase visibility and clarity of the depicted features of prefetch signaling.

Upon receiving the read command from the interface controller, the non-volatile memory (e.g., a local memory controller of non-volatile memory 225) may access the PF counter (e.g., second field 320 described with reference to FIG. 3) associated with the requested data (e.g., data 470-*a* of 64 bytes) and determine a logic state stored in the PF counter. For example, the logic state of the PF counter may correspond to "01," which may indicate the prefetch size for the requested data as 128 bytes (e.g., the size of prefetch data including both data 470-*a* and data 470-*b* of 64 bytes each). Subsequently, the non-volatile memory may determine that accessing data 470-*b* requires activating a subpage that stores data 470-*b*. Activating a subpage to retrieve a set of data therefrom may be associated with an additional delay (e.g., a greater read latency). For example, duration 475 may correspond to a time delay associated with retrieving data 470-*b* by activating the subpage that stores data 470-*b*.

At time t6, the non-volatile memory may start transmitting data 470-*a* using the signal 410-*a* to the interface controller. At time t7, the non-volatile memory may transmit, using the signal 415-*a*, an indicator of the prefetch size (e.g., prefetch indicator signal) associated with the prefetch size (e.g., 128 bytes) associated with the requested data. For example, the signal 415-*a* may include the two (2) bits (e.g., PF bits 480) corresponding to the logic state of the PF counter "01," which may indicate that the prefetch data size corresponds to a total of 128 bytes of data. In addition, the non-volatile memory may include a second indicator as a part of the signal 415-*a* indicating that a remainder of the prefetch data is associated with a time delay (e.g., duration 475). In some cases, the non-volatile memory may use an additional number of bits in the signal 415-*a* (e.g., next bits to the PF bits 480) for the second indicator. The second indicator may indicate a specific duration of the time delay (e.g., a dynamic duration), or may indicate the existence of the time delay, and the duration may be preconfigured (e.g., a static duration).

In this manner, the interface controller may complete receiving the data 470-*a* at time t8 (e.g., 64 bytes of data) and, based on receiving the prefetch indicator signal (e.g., indicating the prefetch size of 128 bytes) and the second indicator (e.g., indicating duration 475 associated with data 470-*b*) using the signal 415-*a*, may transmit a subsequent read command for at least a subset of the remainder of the prefetch data (e.g., data 470-*b*), after a time duration. In some cases, the interface controller may transmit the subsequent read command any time after the time delay (e.g., duration 475) is expired. At time t9, the non-volatile memory may transmit data 470-*b* using the signal 410-*a* to the interface controller in response to receiving the subsequent read command. At time t10, the interface controller may complete receiving data 470-*b* and thus the prefetched data of 128 bytes as indicated by the PF counter.

Additionally or alternatively to the signal 415-*a*, the non-volatile memory (e.g., a local memory controller of non-volatile memory 225) may transmit to the interface controller an indicator of a prefetch size (e.g., prefetch indicator signal) using the signal 420-*a*. For example, after determining that the size of prefetch data corresponds to 128 bytes (that is, based on accessing the PF counter associated with the requested data 470-*a* indicating a prefetch size of 128 bytes), the non-volatile memory may assert the signal 420-*a* to a particular logic state for a certain duration (e.g., "high" during duration 485).

The interface controller, by monitoring the signal 420-*a*, may identify that the non-volatile memory has asserted the signal 420-*a* (e.g., "high" during duration 485) (or has otherwise indicated the prefetch size using a number, duration, or pattern of pulses on signal 420) and thus determine that the incoming prefetch data using the signal 410-*a* corresponds to 128 bytes. In addition, the signal 420-*a* may include a second indicator (e.g., pulse 490) to indicate that a remainder of the prefetch data is associated with a time delay (e.g., duration 475). The second indicator may indicate a specific duration of the time delay (e.g., a dynamic duration), or may indicate the existence of the time delay, and the duration may be preconfigured (e.g., a static duration). In some cases, the non-volatile memory makes various indications (e.g., prefetch indicator signal, a second indicator associated with a time delay) using a pulse duration, a pulse count, a pulse pattern, or any combination thereof.

In this manner, the interface controller may complete receiving the data 470-*a* at time t8 (e.g., 64 bytes of data) and, based on receiving the prefetch indicator signal (e.g., indicating the prefetch size of 128 bytes) and the second indicator (e.g., indicating duration 475 associated with transmitting data 470-*b*) using the signal 420-*a*, may transmit a subsequent read command for at least a subset of the remainder of the prefetched data (e.g., data 470-*b*) after a time duration. In some cases, the interface controller may transmit the subsequent read command any time after the time delay (e.g., duration 475) is expired. At time t9, the non-volatile memory may transmit data 470-*b* using the signal 410-*a* to the interface controller in response to receiving the subsequent read command. At time t10, the interface controller may complete receiving data 470-*b* and thus the prefetched data of 128 bytes as indicated by the PF counter.

Figure 5:
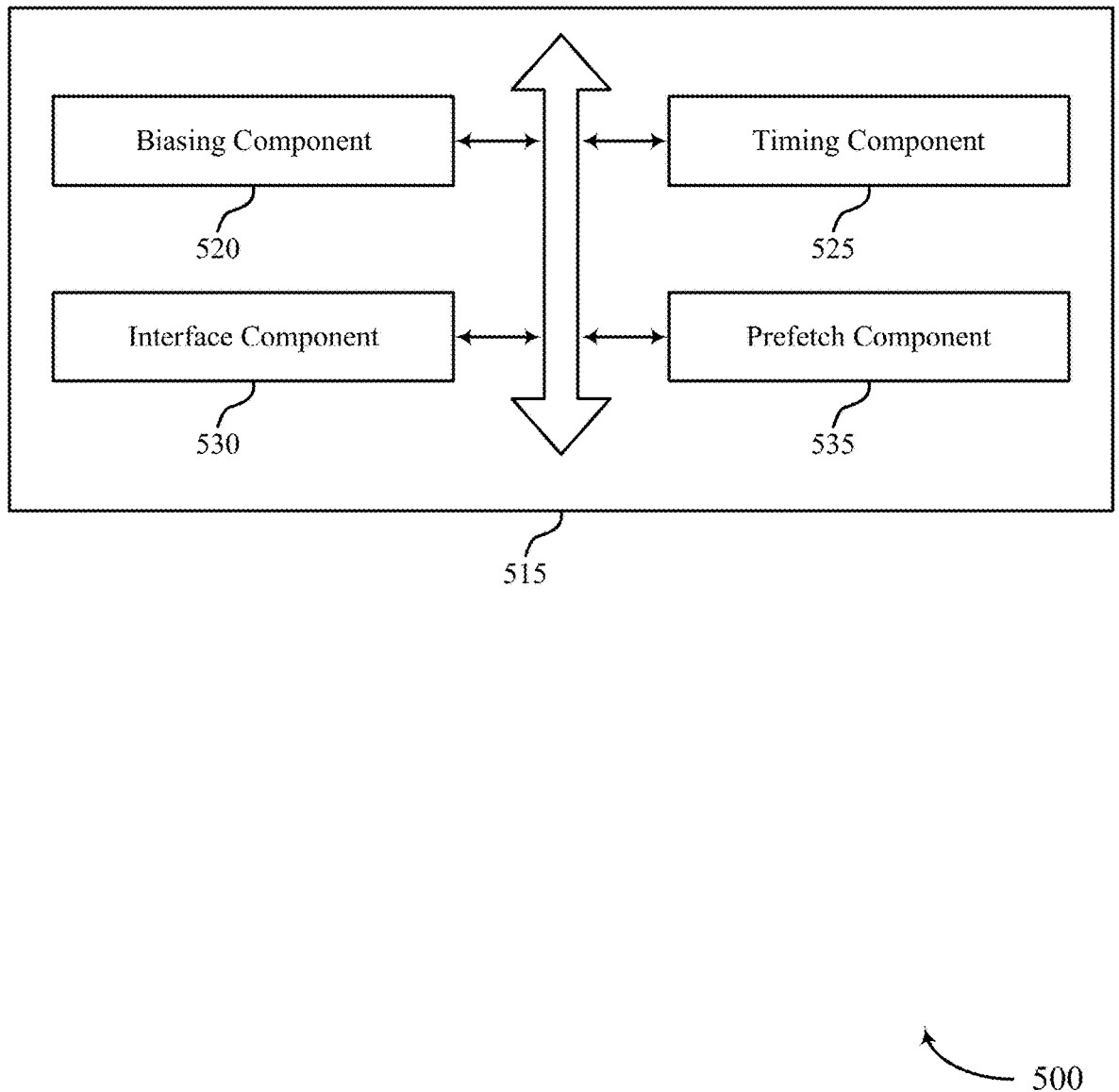
FIGS. 5 through 6 show block diagrams of a device that supports prefetch signaling in a memory system or sub-system in accordance with examples of the present disclosure.

FIG. 5 shows a block diagram 500 of a local memory controller 515 that supports prefetch signaling in memory system or sub-system in accordance with examples of the present disclosure. The local memory controller 515 may be an example of aspects of a local memory controller 226 described with reference to FIG. 2. The local memory controller 515 may include biasing component 520, timing component 525, interface component 530, and prefetch component 535. Each of these modules may communicate, directly or indirectly, with one another (e.g., via one or more buses).

Interface component 530 may receive, from a controller, a read command for a first set of data. Prefetch component 535 may identify, in response to the read command, an indicator associated with the first set of data that indicates a size of a second set of data to be transmitted in response to the read command for the first set of data. Interface component 530 may transmit, to the controller, the indicator with a portion of the second set of data.

In some cases, interface component 530 may also transmit, to the controller, a remainder of the second set of data after transmitting the portion of the second set of data. Interface component 530 may also transmit, to the controller, a second indicator indicating a time delay for at least the subset of the second set of data. Interface component 530 may also transmit the portion of the second set of data via a second pin coupled with the memory array. In some examples, interface component 530 may receive, from the controller, an instruction to update the indicator, the instruction being based on an access pattern associated with the first set of data.

Transmitting the indicator with the portion of the second set of data includes transmitting the indicator concurrently with at least a subset of the portion of the second set of data, in some cases. Transmitting the indicator with the portion of the second set of data includes transmitting the indicator via a first pin coupled with a memory array and designated for command or control information, the memory array storing the indicator and the second set of data, in some cases. In some cases, the first pin is configured for transmitting at least one of data mask/inversion (DMI) information, link error correction code (ECC) parity information, or status information regarding the memory array, or any combination thereof.

Prefetch component 535 may identify, in response to the read command, an indicator associated with the first set of data that indicates a size of a second set of data to be transmitted in response to the read command for the first set of data. Prefetch component 535 may also determine that the second set of data is available in an open page of a memory array including non-volatile memory cells. Prefetch component 535 may also determine that at least a subset of the second set of data is unavailable in an open page of a memory array including non-volatile memory cells. In some examples, prefetch component 535 may identify a value of at least one bit in the first set of memory cells. In some examples, prefetch component 535 may update, in a memory array that stores the indicator and the first set of data, a value of the indicator based on the instruction.

Figure 6:
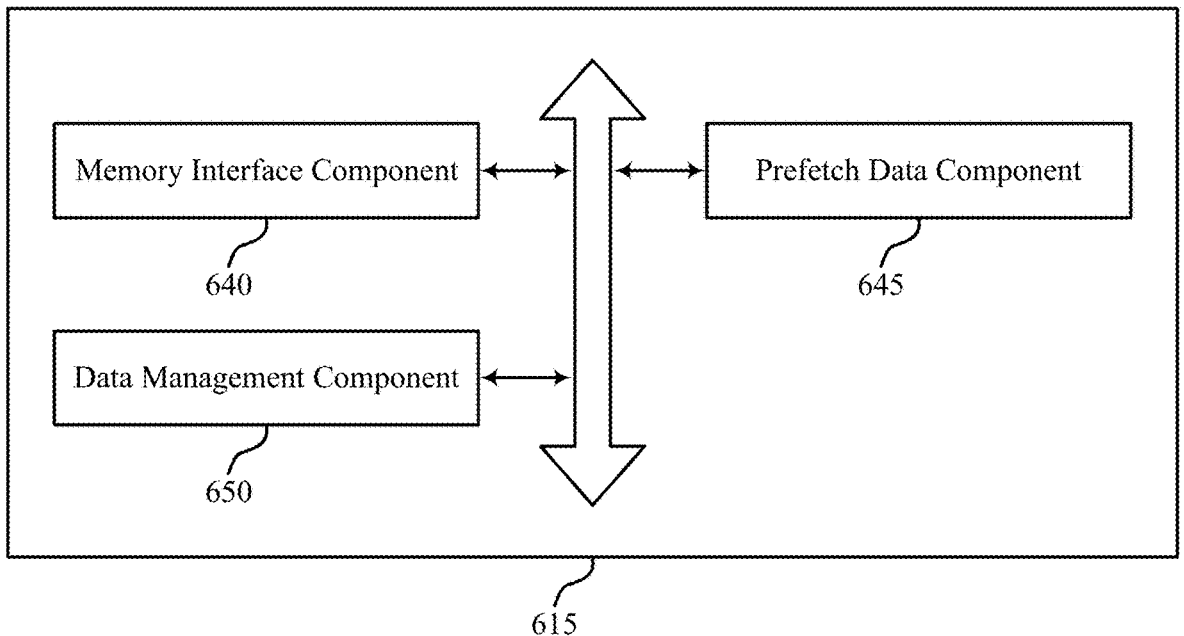

The indicator includes at least one bit in a memory array that stores the second set of data, the memory array including non-volatile memory cells. In some cases, the indicator includes a dynamic counter that indicates the size of the second set of data. In some cases, identifying the indicator includes reading a first set of memory cells in a memory array, the first set of memory cells having a faster nominal access speed than a second set of memory cells in the memory array, the second set of memory cells storing the first set of data FIG. 6 shows a block diagram 600 of an interface controller 615 that supports prefetch signaling in memory system or sub-system in accordance with examples of the present disclosure. The interface controller 615 may be an example of aspects of an interface controller 120 or 230 described with reference to FIGS. 1 and 2. The interface controller 615 may include memory interface component 640, prefetch data component 645, and data management component 650. Each of these modules may communicate, directly or indirectly, with one another (e.g., via one or more buses).

Memory interface component 640 may transmit, to a memory device, a read command for a first set of data, receive, from the memory device, a portion of a second set of data and an indicator of a size of the second set of data, the second set of data including the first set of data, and receive a remainder of the second set of data based on determining the size of the second set of data. Memory interface component 640 may also receive, from the memory device, a second indicator that indicates a latency for at least a subset of the remainder of the second set of data.

Memory interface component 640 may transmit, to the memory device after a time duration associated with the latency, a subsequent read command for at least the subset of the remainder of the second set of data. Memory interface component 640 may transmit, to a memory device, a write command for a value of an indicator of the size of the second set of data. In some examples, memory interface component 640 may transmit, to the memory device, the portion of the first set of data that has been modified. Memory interface component 640 may transmit the write command for the indicator independent of transmitting a write command for the first set of data based on determining that the first set of data is unmodified compared to the corresponding data.

In some cases, receiving the portion of the second set of data with the indicator includes: receiving the indicator concurrently with at least one bit included in the portion of the second set of data. In some cases, the write command for the indicator specifies a location within the memory device for storing the indicator Prefetch data component 645 may determine the size of the second set of data based on the indicator. Prefetch data component 645 may transmit at least the first set of data to a buffer based on determining the size of the second set of data. In some examples, prefetch data component 645 may determine an access pattern for the first set of data based on previous access operations performed by a system on a chip (SoC) or processor, where a first page size is associated with the SoC or processor and a second page size is associated with the memory device and determine a size of a second set of data to be read in response to a subsequent read command for the first set of data, the second set of data including the first set of data. In some examples, prefetch data component 645 may determine the size of the second set of data is based on the access pattern.

Data management component 650 may identify a first set of data for eviction from a buffer, identify a portion of the first set of data that has been modified relative to corresponding data stored in the memory device, and determine that the first set of data is unmodified relative to corresponding data stored in the memory device.

Figure 7:
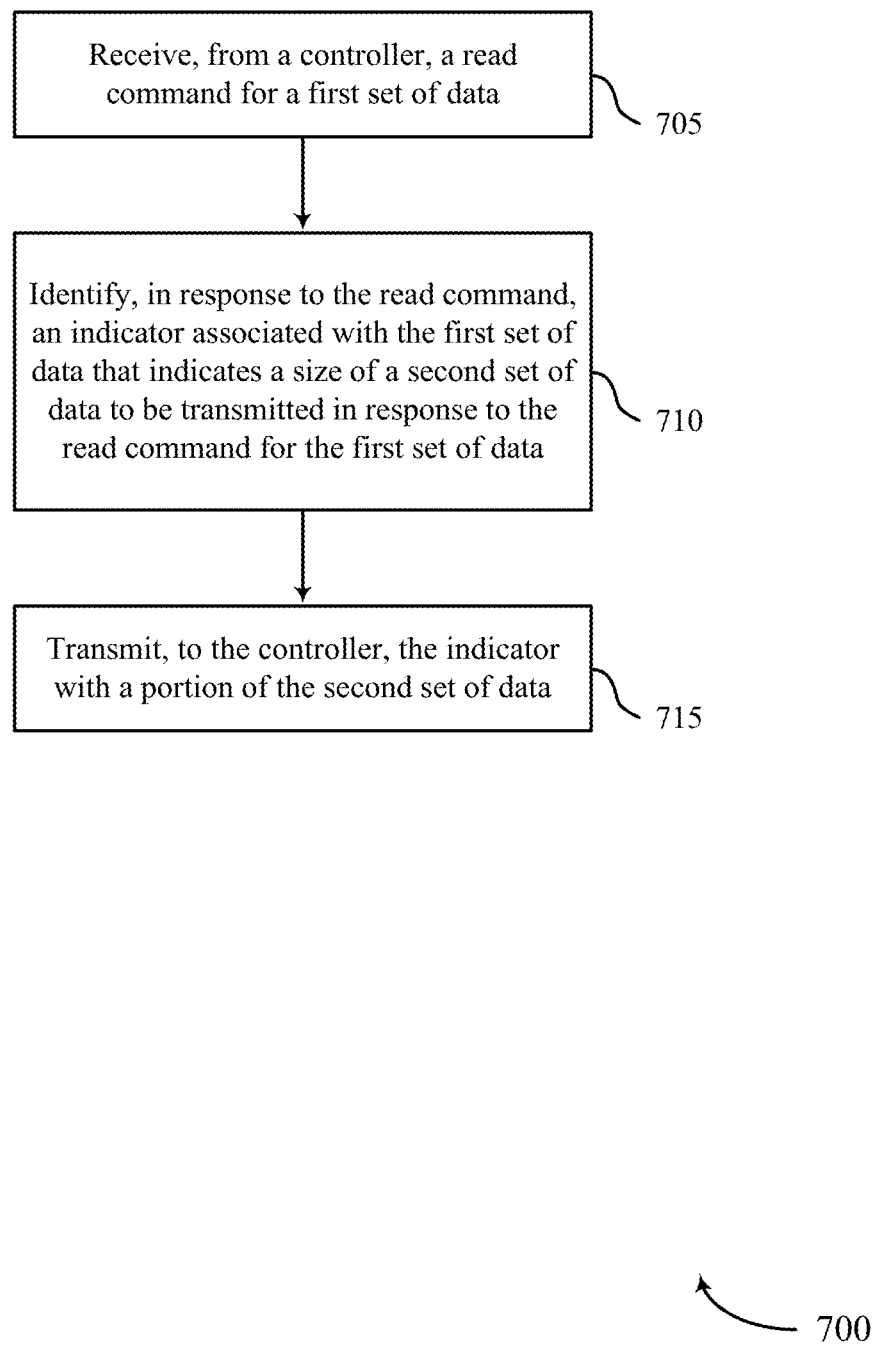
FIGS. 7 through 9 show flowcharts illustrating a method or methods for prefetch signaling in a memory system or sub-system in accordance with examples of the present disclosure.

FIG. 7 shows a flowchart illustrating a method 700 for prefetch signaling in memory system or sub-system in accordance with examples of the present disclosure. The operations of method 700 may be implemented by a memory system, a memory sub-system, or its components as described herein. For example, the operations of method 700 may be performed by a non-volatile memory 225 (e.g., a local memory controller of non-volatile memory 225) as described with reference to FIG. 2. In some examples, a non-volatile memory 225 may execute a set of codes to control the functional elements of the device to perform the functions described below. Additionally or alternatively, the non-volatile memory 225 may perform aspects of the functions described below using special-purpose hardware.

At 705 the non-volatile memory 225 may receive, from a controller, a read command for a first set of data. The operations of 705 may be performed according to the methods described with reference to FIGS. 1 through 4. In certain examples, aspects of the operations of 705 may be performed by an interface component 530 as described with reference to FIG. 5.

At 710 the non-volatile memory 225 may identify, in response to the read command, an indicator associated with the first set of data that indicates a size of a second set of data to be transmitted in response to the read command for the first set of data. The operations of 710 may be performed according to the methods described with reference to FIGS. 1 through 4. In certain examples, aspects of the operations of 710 may be performed by a prefetch component 535 as described with reference to FIG. 5.

At 715 the non-volatile memory 225 may transmit, to the controller, the indicator with a portion of the second set of data. The operations of 715 may be performed according to the methods described with reference to FIGS. 1 through 4. In certain examples, aspects of the operations of 715 may be performed by an interface component 530 as described with reference to FIG. 5.

An apparatus for performing the method 700 is described. The apparatus may include means for receiving, from a controller, a read command for a first set of data, means for identifying, in response to the read command, an indicator associated with the first set of data that indicates a size of a second set of data to be transmitted in response to the read command for the first set of data, and means for transmitting, to the controller, the indicator with a portion of the second set of data.

Another apparatus for performing the method 700 is described. The apparatus may include a memory cell and a local memory controller in electronic communication with the memory cell and a controller, wherein the local memory controller is operable to receive, from the controller, a read command for a first set of data, identify, in response to the read command, an indicator associated with the first set of data that indicates a size of a second set of data to be transmitted in response to the read command for the first set of data, and transmit, to the controller, the indicator with a portion of the second set of data.

In some examples of the method 700 and apparatus described above, transmitting the indicator with the portion of the second set of data comprises: transmitting the indicator concurrently with at least a subset of the portion of the second set of data. In some examples of the method 700 and apparatus described above, the indicator comprises at least one bit in a memory array that stores the second set of data, the memory array comprising non-volatile memory cells. In some examples of the method 700 and apparatus described above, the indicator comprises a dynamic counter that indicates the size of the second set of data.

Some examples of the method 700 and apparatus described above may further include processes, features, means, or instructions for determining that the second set of data may be available in an open page of a memory array comprising non-volatile memory cells. Some examples of the method 700 and apparatus described above may further include processes, features, means, or instructions for transmitting, to the controller, a remainder of the second set of data after transmitting the portion of the second set of data.

Some examples of the method 700 and apparatus described above may further include processes, features, means, or instructions for determining that at least a subset of the second set of data may be unavailable in an open page of a memory array comprising non-volatile memory cells. Some examples of the method 700 and apparatus described above may further include processes, features, means, or instructions for transmitting, to the controller, a second indicator indicating a time delay for at least the subset of the second set of data.

In some examples of the method 700 and apparatus described above, transmitting the indicator with the portion of the second set of data comprises: transmitting the indicator via a first pin coupled with a memory array and designated for command or control information, the memory array storing the indicator and the second set of data. Some examples of the method 700 and apparatus described above may further include processes, features, means, or instructions for transmitting the portion of the second set of data via a second pin coupled with the memory array. In some examples of the method 700 and apparatus described above, the first pin may be configured for transmitting at least one of data mask/inversion (DMI) information, link error correction code (ECC) parity information, or status information regarding the memory array, or any combination thereof.

In some examples of the method 700 and apparatus described above, identifying the indicator comprises: reading a first set of memory cells in a memory array, the first set of memory cells having a faster nominal access speed than a second set of memory cells in the memory array, the second set of memory cells storing the first set of data. Some examples of the method 700 and apparatus described above may further include processes, features, means, or instructions for identifying a value of at least one bit in the first set of memory cells.

Some examples of the method 700 and apparatus described above may further include processes, features, means, or instructions for receiving, from the controller, an instruction to update the indicator, the instruction being based at least in part on an access pattern associated with the first set of data. Some examples of the method 700 and apparatus described above may further include processes, features, means, or instructions for updating, in a memory array that stores the indicator and the first set of data, a value of the indicator based at least in part on the instruction.

Figure 8:
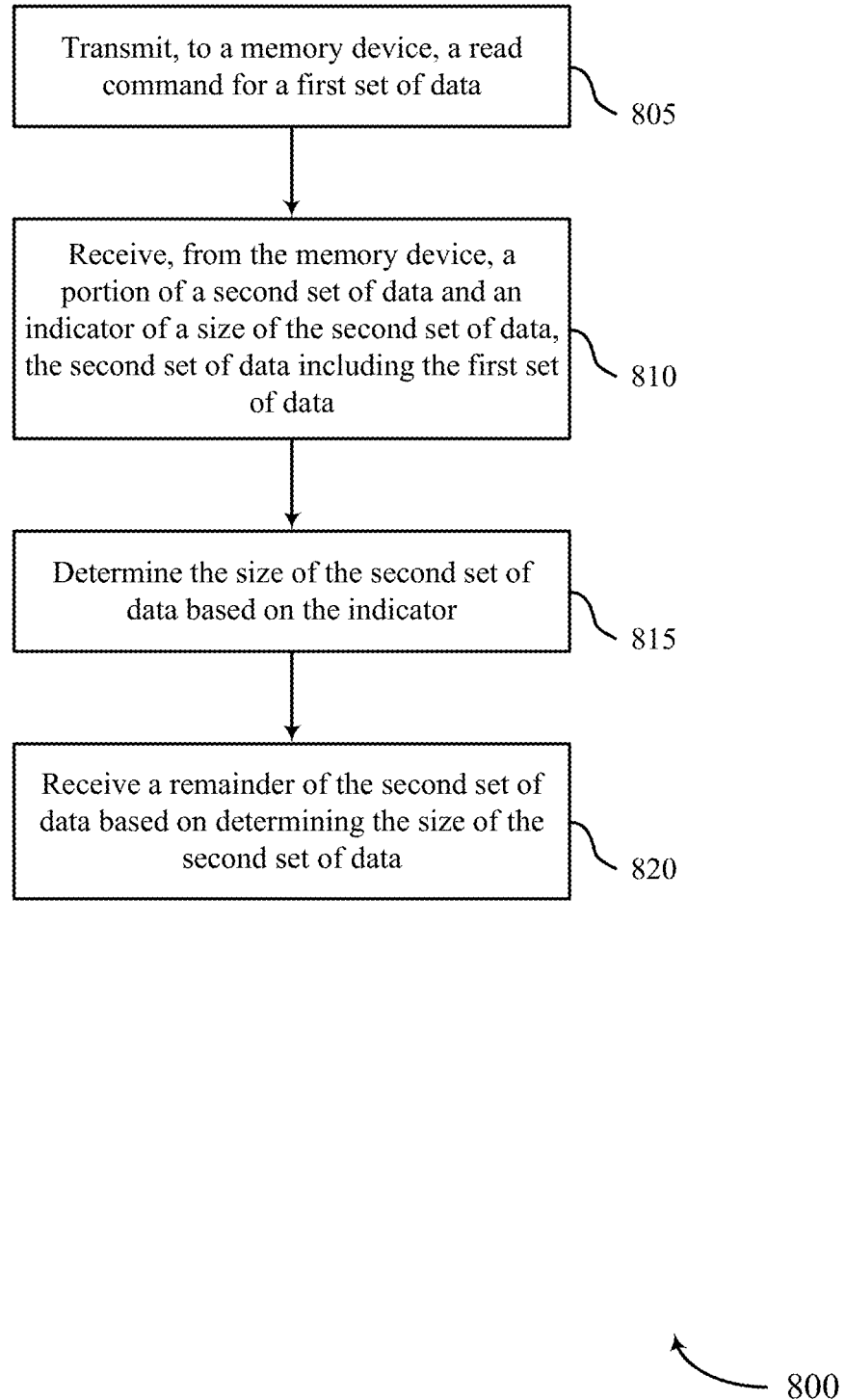

FIG. 8 shows a flowchart illustrating a method 800 for prefetch signaling in memory system or sub-system in accordance with examples of the present disclosure. The operations of method 800 may be implemented by a memory system, sub-system, or its components as described herein. For example, the operations of method 800 may be performed by an interface controller 230 as described with reference to FIG. 2. In some examples, the interface controller 230 may execute a set of codes to control the functional elements of the device to perform the functions described below. Additionally or alternatively, the interface controller 230 may perform aspects of the functions described below using special-purpose hardware.

At 805 the interface controller 230 may transmit, to a memory device, a read command for a first set of data. The operations of 805 may be performed according to the methods described with reference to FIGS. 1 through 4. In certain examples, aspects of the operations of 805 may be performed by a memory interface component 640 as described with reference to FIG. 6.

At 810 the interface controller 230 may receive, from the memory device, a portion of a second set of data and an indicator of a size of the second set of data, the second set of data including the first set of data. The operations of 810 may be performed according to the methods described with reference to FIGS. 1 through 4. In certain examples, aspects of the operations of 810 may be performed by a memory interface component 640 as described with reference to FIG. 6.

At 815 the interface controller 230 may determine the size of the second set of data based at least in part on the indicator. The operations of 815 may be performed according to the methods described with reference to FIGS. 1 through 4. In certain examples, aspects of the operations of 815 may be performed by a prefetch data component 645 as described with reference to FIG. 6.

At 820 the interface controller 230 may receive a remainder of the second set of data based at least in part on determining the size of the second set of data. The operations of 820 may be performed according to the methods described with reference to FIGS. 1 through 4. In certain examples, aspects of the operations of 820 may be performed by a memory interface component 640 as described with reference to FIG. 6.

An apparatus for performing the method 800 is described. The apparatus may include means for transmitting, to a memory device, a read command for a first set of data, means for receiving, from the memory device, a portion of a second set of data and an indicator of a size of the second set of data, the second set of data including the first set of data, means for determining the size of the second set of data based at least in part on the indicator, and means for receiving a remainder of the second set of data based at least in part on determining the size of the second set of data.

Another apparatus for performing the method 800 is described. The apparatus may include a memory device and an interface controller in electronic communication with the memory device, wherein the interface controller is operable to transmit, to the memory device, a read command for a first set of data, receive, from the memory device, a portion of a second set of data and an indicator of a size of the second set of data, the second set of data including the first set of data, determine the size of the second set of data based at least in part on the indicator, and receive a remainder of the second set of data based at least in part on determining the size of the second set of data.

In some examples of the method 800 and apparatus described above, receiving the portion of the second set of data with the indicator comprises: receiving the indicator concurrently with at least one bit included in the portion of the second set of data. Some examples of the method 800 and apparatus described above may further include processes, features, means, or instructions for transmitting at least the first set of data to a buffer based at least in part on determining the size of the second set of data.

Some examples of the method 800 and apparatus described above may further include processes, features, means, or instructions for receiving, from the memory device, a second indicator that indicates a latency for at least a subset of the remainder of the second set of data. Some examples of the method 800 and apparatus described above may further include processes, features, means, or instructions for transmitting, to the memory device after a time duration associated with the latency, a subsequent read command for at least the subset of the remainder of the second set of data.

Figure 9:
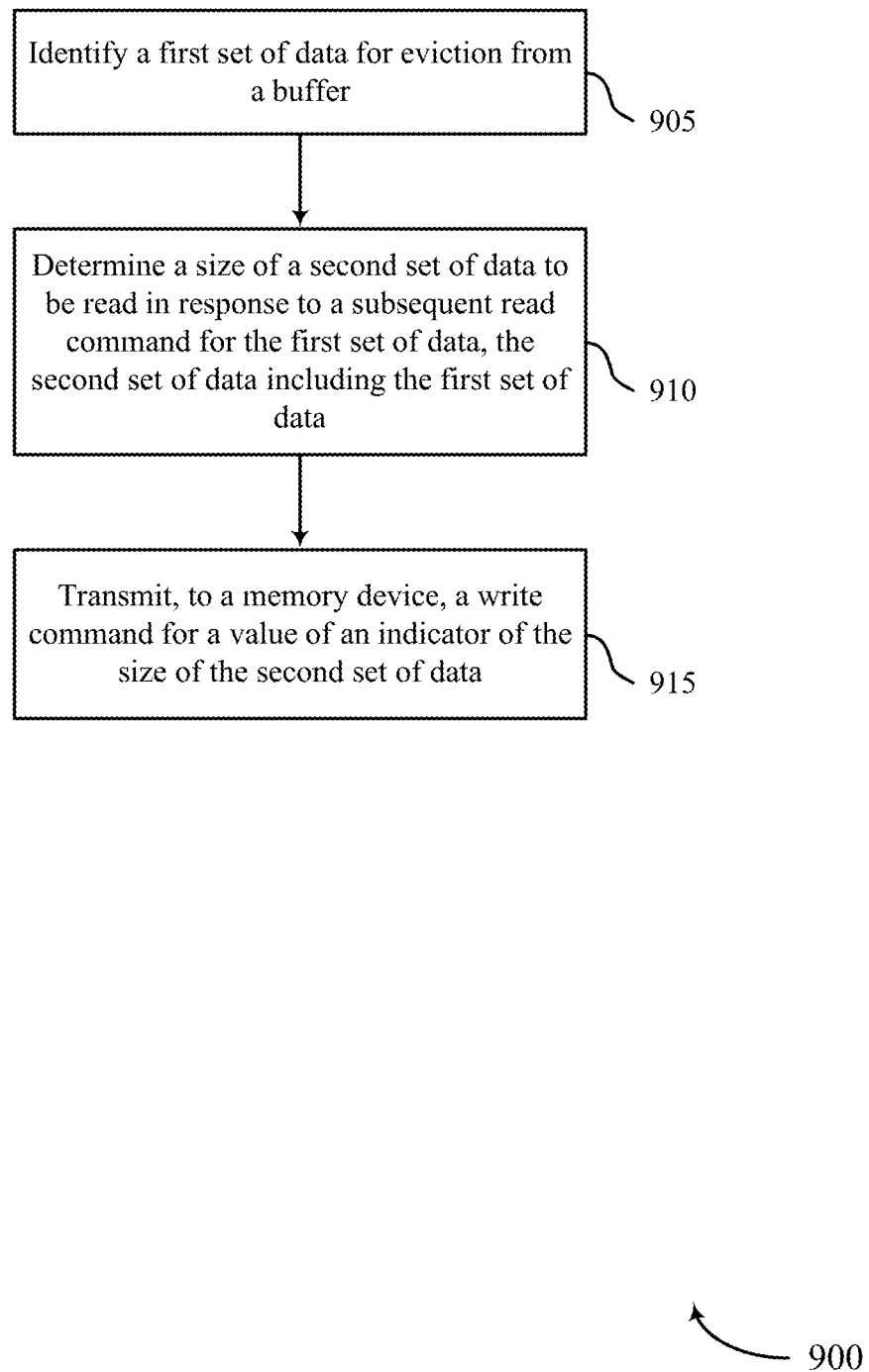

FIG. 9 shows a flowchart illustrating a method 900 for prefetch signaling in memory system or sub-system in accordance with examples of the present disclosure. The operations of method 900 may be implemented by a memory system, sub-system, or its components as described herein. For example, the operations of method 900 may be performed by an interface controller 230 as described with reference to FIG. 2. In some examples, the interface controller 230 may execute a set of codes to control the functional elements of the device to perform the functions described below. Additionally or alternatively, the interface controller 230 may perform aspects of the functions described below using special-purpose hardware.

At 905 the interface controller 230 may identify a first set of data for eviction from a buffer. The operations of 905 may be performed according to the methods described with reference to FIGS. 1 through 4. In certain examples, aspects of the operations of 905 may be performed by a data management component 650 as described with reference to FIG. 6.

At 910 the interface controller 230 may determine a size of a second set of data to be read in response to a subsequent read command for the first set of data, the second set of data including the first set of data. The operations of 910 may be performed according to the methods described with reference to FIGS. 1 through 4. In certain examples, aspects of the operations of 910 may be performed by a prefetch data component 645 as described with reference to FIG. 6.

At 915 the interface controller 230 may transmit, to a memory device, a write command for a value of an indicator of the size of the second set of data. The operations of 915 may be performed according to the methods described with reference to FIGS. 1 through 4. In certain examples, aspects of the operations of 915 may be performed by a memory interface component 640 as described with reference to FIG. 6.

An apparatus for performing the method 900 is described. The apparatus may include means for identifying a first set of data for eviction from a buffer, means for determining a size of a second set of data to be read in response to a subsequent read command for the first set of data, the second set of data including the first set of data, and means for transmitting, to a memory device, a write command for a value of an indicator of the size of the second set of data.

Another apparatus for performing the method 900 is described. The apparatus may include a memory device and an interface controller in electronic communication with the memory device, wherein the interface controller is operable to identify a first set of data for eviction from a buffer, determine a size of a second set of data to be read in response to a subsequent read command for the first set of data, the second set of data including the first set of data, and transmit, to the memory device, a write command for a value of an indicator of the size of the second set of data.

Some examples of the method 900 and apparatus described above may further include processes, features, means, or instructions for determining an access pattern for the first set of data based at least in part on previous access operations performed by a system on a chip (SoC) or processor, wherein a first page size may be associated with the SoC or processor and a second page size may be associated with the memory device. Some examples of the method 900 and apparatus described above may further include processes, features, means, or instructions for determining the size of the second set of data may be based at least in part on the access pattern.

Some examples of the method 900 and apparatus described above may further include processes, features, means, or instructions for identifying a portion of the first set of data that may have been modified relative to corresponding data stored in the memory device. Some examples of the method 900 and apparatus described above may further include processes, features, means, or instructions for transmitting, to the memory device, the portion of the first set of data that may have been modified.

Some examples of the method 900 and apparatus described above may further include processes, features, means, or instructions for determining that the first set of data may be unmodified relative to corresponding data stored in the memory device. Some examples of the method 900 and apparatus described above may further include processes, features, means, or instructions for transmitting the write command for the indicator independent of transmitting a write command for the first set of data based at least in part on determining that the first set of data may be unmodified compared to the corresponding data.

In some examples of the method 900 and apparatus described above, the write command for the indicator specifies a location within the memory device for storing the indicator.

It should be noted that the methods described above describe possible implementations, and that the operations and the steps may be rearranged or otherwise modified and that other implementations are possible. Furthermore, features from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a memory array to store an indicator, a first set of data, and a second set of data; and
   a first controller coupled with a second controller and operable to:
   receive, from the second controller, a read command for the first set of data;
   identify a size of the second set of data to be transmitted for the read command based at least in part on the indicator;
   transmit, to the second controller, a portion of the second set of data along with an indication of the size of the second set of data, wherein the size of the second set of data is greater than a size of the portion of the second set of data;
   determine that at least a subset of the second set of data is unavailable in an open page of the memory array comprising non-volatile memory cells; and
   transmit, to the second controller, a second indication of a time delay for at least the subset of the second set of data based at least in part on the subset of the second set of data being unavailable in the open page.

2. The apparatus of claim 1, wherein transmitting the indication along with the portion of the second set of data comprises:
   transmitting the indication concurrently with the portion of the second set of data.

3. The apparatus of claim 1, wherein the indication comprises at least one bit in the memory array.

4. The apparatus of claim 1, wherein the first controller is further operable to:
   determine that a second portion of the second set of data is available in the open page of the memory array; and
   transmit, to the second controller, the second portion of the second set of data after transmitting the portion of the second set of data based at least in part on the second set of data being available in the open page.

5. The apparatus of claim 1, wherein the first controller is further operable to:
   read a first set of memory cells in the memory array, the first set of memory cells having a faster nominal access speed than a second set of memory cells in the memory array, the second set of memory cells storing the first set of data; and
   identify a value of at least one bit in the first set of memory cells, wherein identifying the indicator is based at least in part on identifying the value of the at least one bit.

6. The apparatus of claim 1, wherein the first controller is further operable to:
   receive, from the second controller, an indication to update the indicator based at least in part on an access pattern associated with the first set of data; and
   update, in the memory array, a value of the indicator based at least in part on the indication.

7. An apparatus, comprising:
   a memory array to store an indicator, a first set of data, and a second set of data; and
   a first controller coupled with a second controller and operable to:
   receive, from the second controller, a read command for the first set of data;
   identify a size of the second set of data to be transmitted for the read command based at least in part on the indicator; and
   transmit, to the second controller, a portion of the second set of data along with an indication of the size of the second set of data, wherein the size of the second set of data is greater than a size of the portion of the second set of data, and wherein the first controller is operable to transmit the portion of the second set of data along with the indication by being operable to:
   transmit the indication via a first pin coupled with the memory array, the first pin designated for command or control information; and transmit the portion of the second set of data via a second pin coupled with the memory array.

8. The apparatus of claim 7, wherein the first pin is configured for transmitting at least one of data mask/inversion (DMI) information, link error correction code (ECC) parity information, or status information regarding the memory array, or any combination thereof.

9. An apparatus, comprising:
a memory device comprising a memory array configured to store a first set of data and a second set of data; and
a controller coupled with the memory device, the controller operable to:
transmit, to the memory device, a read command for the first set of data of a first size;
receive, from the memory device, a portion of the second set of data and an indicator of a second size of the second set of data that includes the first set of data;
determine that the second size of the second set of data is greater than the first size based at least in part on the indicator;
receive a remainder of the second set of data based at least in part on determining that the second size of the second set of data is greater than the first size; and
receive, from the memory device, a second indicator that indicates a latency for at least a subset of the remainder of the second set of data.

10. The apparatus of claim 9, wherein receiving the portion of the second set of data and the indicator comprises:
receiving the indicator concurrently with at least one bit included in the portion of the second set of data.

11. The apparatus of claim 9, wherein the controller is further operable to:
transmit the first set of data to a buffer based at least in part on determining the second size of the second set of data, wherein the portion comprises the first set of data.

12. The apparatus of claim 9, wherein the controller is further operable to:
transmit, to the memory device and based at least in part on the latency, a subsequent read command for at least the subset of the remainder of the second set of data.

* * * * *